US011689075B2

(12) United States Patent
Makino et al.

(10) Patent No.: US 11,689,075 B2
(45) Date of Patent: Jun. 27, 2023

(54) MOTOR UNIT

(71) Applicant: NIDEC CORPORATION, Kyoto (JP)

(72) Inventors: Takayuki Makino, Kyoto (JP); Satoshi Mukai, Kyoto (JP); Masato Aono, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 17/676,226

(22) Filed: Feb. 21, 2022

(65) Prior Publication Data

US 2022/0271605 A1 Aug. 25, 2022

(30) Foreign Application Priority Data

Feb. 24, 2021 (JP) ................................ 2021-027971

(51) Int. Cl.
*H02K 5/16* (2006.01)
*H02K 9/19* (2006.01)
*H02K 21/12* (2006.01)
*H02K 13/10* (2006.01)

(52) U.S. Cl.
CPC ................ *H02K 5/16* (2013.01); *H02K 9/19* (2013.01); *H02K 13/10* (2013.01); *H02K 21/12* (2013.01)

(58) Field of Classification Search
CPC .......... H02K 5/16; H02K 5/1732; H02K 9/19; H02K 11/40
See application file for complete search history.

(56) References Cited

U.S. PATENT DOCUMENTS

| | | | | |
|---|---|---|---|---|
| 4,515,417 A * | 5/1985 | Shiraishi | F16C 41/002 | 384/537 |
| 5,955,807 A * | 9/1999 | Kajiura | H02K 21/044 | 310/156.69 |
| 7,193,836 B2 * | 3/2007 | Oh | H02K 11/40 | 361/220 |
| 7,521,827 B2 * | 4/2009 | Orlowski | H02K 11/40 | 277/412 |
| 2005/0285464 A1 * | 12/2005 | Orders | H02K 11/40 | 310/239 |
| 2006/0007609 A1 * | 1/2006 | Oh | H02K 11/40 | 361/23 |
| 2012/0206022 A1 * | 8/2012 | Wilson, Jr. | H02K 5/207 | 310/401 |

FOREIGN PATENT DOCUMENTS

JP 201760401 A 3/2017

* cited by examiner

*Primary Examiner* — Dang D Le
(74) *Attorney, Agent, or Firm* — Hauptman Ham, LLP

(57) ABSTRACT

A motor unit includes a bearing rotatably holding a shaft, and a housing accommodating a rotor, a stator, and the bearing. The housing has an opening, a cover closing the opening and fixed to the housing, and an annular member that has an annular shape when viewed from the axial direction and is provided independently from the bearing. The cover includes an accommodation portion accommodating the annular member, one or more ribs disposed radially outward of the accommodation portion when viewed from the axial direction, and one or more fixing points fixed to the housing. The one or more ribs extend outward from the accommodation portion. When viewed from the axial direction, for at least one of the ribs, the fixing point is formed on an extension line extending outward from the rib in a direction in which the rib extends.

15 Claims, 18 Drawing Sheets

MOTOR UNIT

CROSS-REFERENCE TO RELATED APPLICATIONS

The present invention claims priority under 35 U.S.C. § 119 to Japanese Patent Application No. 2021-027971 filed on Feb. 24, 2021, the entire content of which is incorporated herein by reference.

FIELD OF THE INVENTION

The present invention relates to a motor unit.

BACKGROUND

Conventionally, a rotating machine having a casing accommodating a rotating shaft and an end plate provided on one end of the casing in the axial direction is known.

Here, when the annular member is accommodated in the end plate, vibration is transmitted from the casing to the annular member via the end plate, and the annular member may vibrate relative to the end plate. In this case, there is a risk of noise.

SUMMARY

An exemplary motor unit of the present invention includes a rotor that includes a shaft rotatable around a rotation axis, a stator, a bearing that rotatably holds the shaft, and a housing that accommodates the rotor, the stator, the bearing and has an opening on an axial one side, a cover that closes the opening and is fixed to the housing, and an annular member that has an annular shape when viewed from an axial direction and is provided independently from the bearing.

The cover includes an accommodation portion that protrudes from an axial one side outer face to the axial one side, is recessed from an axial other side outer face to the axial one side, and accommodates the annular member, one or more ribs that protrude from the axial one side outer face of the cover to the axial one side, and are disposed radially outward of the accommodation portion when viewed from the axial direction, and one or more fixing points fixed to the housing.

The one or more ribs extend outward from the accommodation portion. When viewed from the axial direction, for at least one of the ribs, the fixing point is formed on an extension line extending outward from the at least one rib in a direction in which the at least one rib extends.

The above and other elements, features, steps, characteristics and advantages of the present disclosure will become more apparent from the following detailed description of the preferred embodiments with reference to the attached drawings.

DETAILED DESCRIPTION

Figure 1:
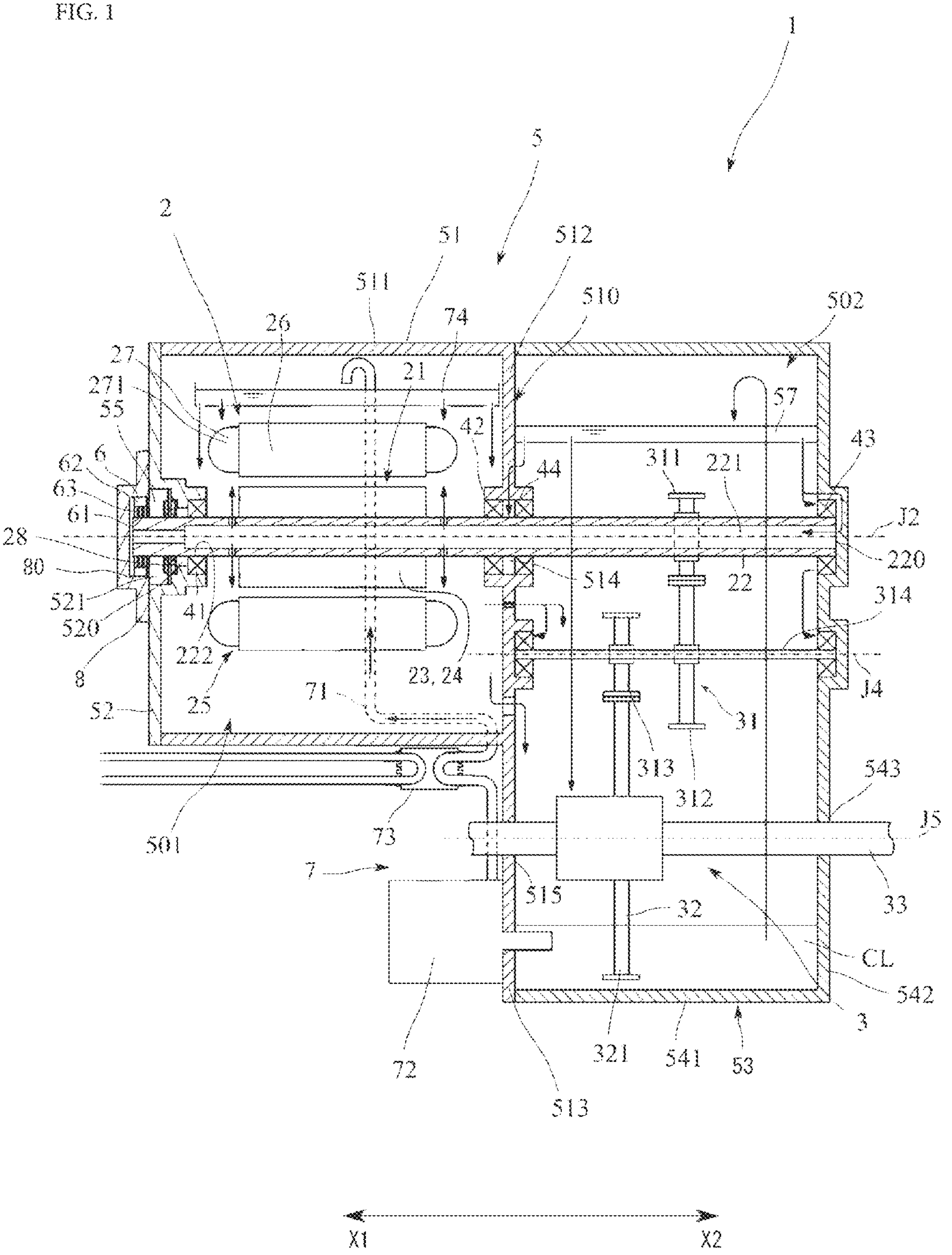
FIG. 1 is a schematic diagram of a motor unit according to an embodiment.

In the present specification, a direction parallel to a rotation axis J2 of a rotor 21 of a motor 2 is referred to as an "axial direction" of a motor unit 1. The axial one side X1 and the axial other side X2 are defined as shown in the drawings. Additionally, the radial direction orthogonal to the rotation axis J2 is simply referred to as "radial direction", and the circumferential direction around the rotation axis J2 is simply referred to as "circumferential direction".

Figure 2:
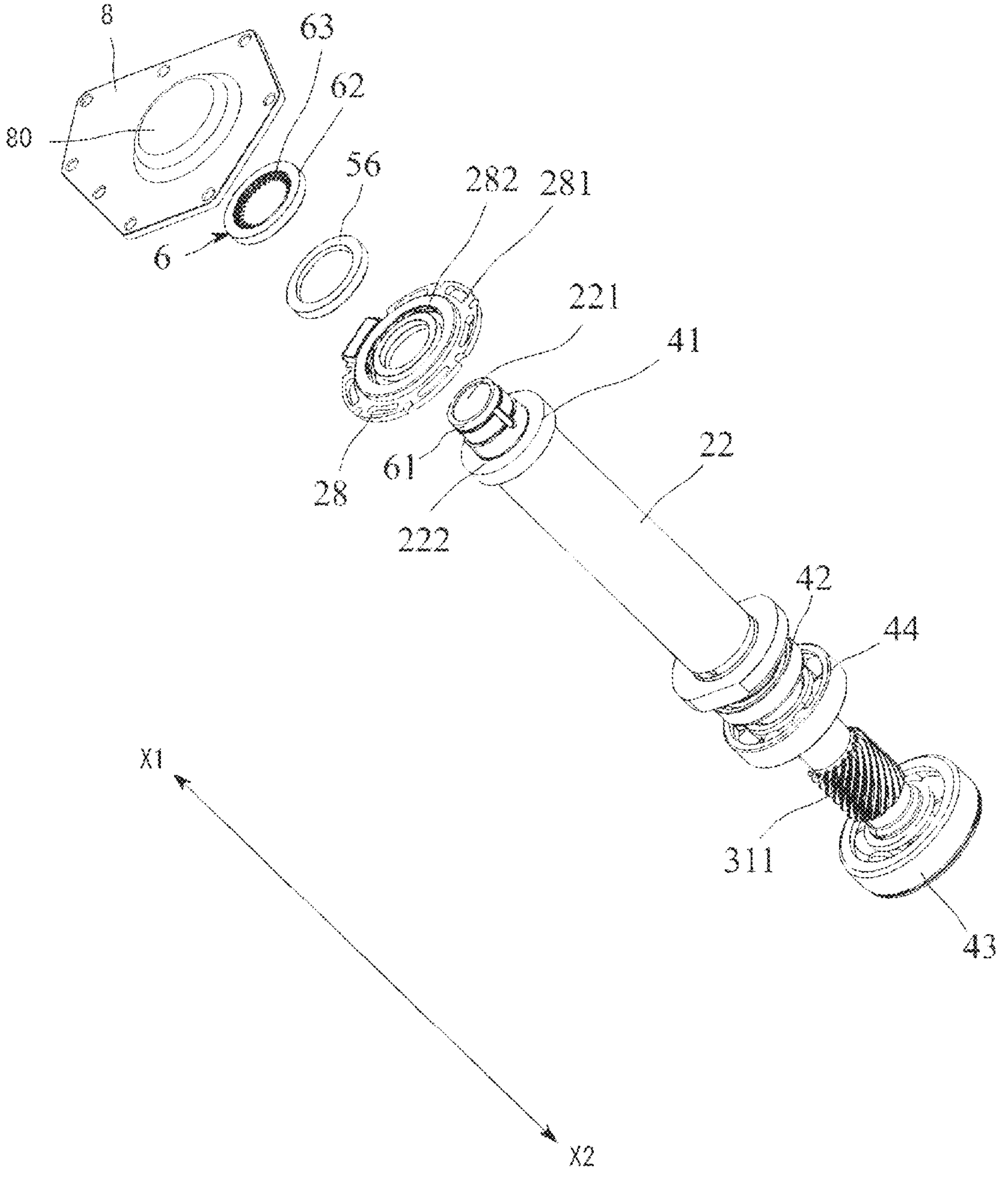
FIG. 2 is a partially exploded perspective view including a shaft.

The motor unit 1 according to the exemplary embodiment of the present invention will be described below with reference to the drawings. FIG. 1 is a schematic diagram of the motor unit 1 according to an embodiment. FIG. 2 is a partially exploded perspective view including a shaft 22. Note that FIG. 1 is merely the conceptual diagram, and a layout and a dimension of each unit are not necessarily identical to a layout and a dimension of each unit of the actual motor unit 1.

The motor unit 1 is mounted on a vehicle such as a hybrid vehicle (HV), a plug-in hybrid vehicle (PHV), and an electric vehicle (EV) in which at least the motor is used as a power source. The motor unit 1 is used as the power source of the vehicle.

As illustrated in FIG. 1, the motor unit 1 has the motor 2, a housing 5, and a ring brush 6. The housing 5 accommodates the motor 2. Additionally, the motor unit 1 further has a gear unit 3 connected to the axial other side T of the shaft 22 and accommodated in the housing 5.

The motor 2 is a DC brushless motor. The motor 2 is driven by electric power from an inverter (not shown). The motor 2 includes the rotor 21 that rotates around the rotation axis J2 extending in the horizontal direction, and a stator 25 located radially outward of the rotor 21. That is, the motor unit 1 has the stator 25. That is, the motor 2 is an inner rotor type motor in which the rotor 21 is rotatably disposed inward of the stator 25.

An electric power is supplied to the stator 25, and thus, the rotor 21 rotates. The rotor 21 includes a shaft 22, a rotor core 23, and a rotor magnet 24. The rotor 21 rotates around the rotation axis J2 extending in the horizontal direction.

The shaft 22 extends around the rotation axis J2 extending horizontally and in the vehicle width direction. The shaft 22 rotates around the rotation axis J2. That is, the motor unit 1 has the rotor 21 including the shaft 22 that is rotatable around the rotation axis J2.

In the motor unit 1 of the present embodiment, a lubricating oil CL as a coolant to be described later flows through a hollow portion 221 of the shaft 22. For this reason, the shaft 22 has therein the hollow portion 221 penetrating along the rotation axis J2, and has an inlet 220 through which the lubricating oil CL flows into the hollow portion 221 to the axial other side.

The shaft 22 is rotatably supported by the housing 5 through a first bearing 41, a second bearing 42, a third bearing 43, and a fourth bearing 44 to be described later. That is, the bearings 41, 42, 43, and 44 are fixed to the housing 5 to rotatably support the shaft 22.

Note that the shaft 22 can be divided into a portion in a motor accommodation space 501 and a portion in a gear unit accommodation space 502. When the shaft 22 is dividable, the divided shafts 22 can adopt a screw coupling using a male screw and a female screw, for example. Alternatively, the divided shafts 22 may be joined by a fixing method such as press fitting or welding. When the fixing method such as press-fitting or welding is used, serrations combining recesses and protrusions extending in the axial direction may be used. With such a configuration, it is possible to reliably transmit the rotation. Additionally, the shaft 22 may be formed as a single member.

The rotor core 23 is formed by laminating thin electromagnetic steel plates. The rotor core 23 is a columnar body extending along the axial direction. A plurality of rotor magnets 24 is fixed to the rotor core 23. The plurality of rotor magnets 24 is disposed along the circumferential direction with magnetic poles disposed alternately.

The stator 25 includes a stator core 26, a coil 27, and an insulator (not illustrated) interposed between the stator core 26 and the coil 27. The stator 25 is held by the housing 5. The stator core 26 has a plurality of magnetic pole teeth (not shown) extending radially inward from an inner circumferential face of an annular yoke.

The coil 27 is formed by winding an electric wire around the magnetic pole teeth. The coil 27 is connected to an inverter unit (not shown) through a bus bar (not shown). The coil 27 includes a coil end protruding from the axial end face of the stator core 26. The coil end protrudes in the axial direction relative to the end portion of the rotor core 23 of the rotor 21.

A resolver 28 is attached to the axial one side end portion of the shaft 22. The resolver 28 detects the position of the rotor 21, that is, the rotation angle. As illustrated in FIG. 2, the resolver 28 has a resolver stator 281 and a resolver rotor 282. The resolver stator 281 is fixed to a later-described bearing holder 52 of the housing 5. The resolver rotor 282 is fixed to the shaft 22.

The resolver stator 281 has an annular shape, and the resolver rotor 282 has a disk shape. An inner circumferential face of the resolver stator 281 and an outer circumferential face of the resolver rotor 282 face each other in the radial direction. The resolver stator 281 periodically detects the position of the resolver rotor 282 when the rotor 21 rotates.

As a result, the resolver 28 acquires information on the position of the rotor 21 from the information on the position of the resolver rotor 282.

Additionally, a bus bar (not shown) is disposed at the axial one side end portion inside the housing 5. The bus bar connects an inverter unit (not illustrated) and the coil 27 and supplies an electric power to the coil 27. Electric power is supplied to the coil 27 from the axial one side.

The gear unit 3 has a plurality of gears and is accommodated in the housing 5. As described above, the gear unit 3 is connected to the shaft 22 at the axial other side. The gear unit 3 has a deceleration portion 31 and a differential portion 32.

A deceleration portion 31 is connected to the shaft 22. The deceleration portion 31 transmits the torque output from the motor 2 to the differential portion 32. The deceleration portion 31 reduces the rotation speed of the motor 2 according to the reduction ratio and increases the torque output from the motor 2 according to the reduction ratio.

The deceleration portion 31 is a speed reducer of a parallel-axis gearing type, in which center axes of gears are disposed in parallel with each other. The deceleration portion 31 has a first gear 311 which is an intermediate drive gear, a second gear 312 which is an intermediate gear, a third gear 313 which is a final drive gear, and an intermediate shaft 314.

The first gear 311 is disposed on an outer circumferential face of the shaft 22. In the motor unit 1 of the present embodiment, the first gear 311 and the shaft 22 are formed of a single member. The first gear 311 rotates around the rotation axis J2 together with the shaft 22. The intermediate shaft 314 extends along an intermediate axis J4 parallel to the rotation axis J2. Both end portions in the axial direction of the intermediate shaft 314 are rotatably supported by the housing 5 through bearings.

The second gear 312 and the third gear 313 are disposed on the intermediate shaft 314. The second gear 312 meshes with the first gear 311. The third gear 313 meshes with a ring gear 321 of the differential portion 32. The torque of the shaft 22 is transmitted from the first gear 311 to the second gear 312. Then, the torque transmitted to the second gear 312 is transmitted to the third gear 313 through the intermediate shaft 314. The torque transmitted to the third gear 313 is transmitted to the ring gear 321 of the differential portion 32. In this manner, the deceleration portion 31 transmits the torque output from the motor 2 to the differential portion 32. The number of gears, the gear ratios of the gears, and so on can be modified in various manners according to the desired reduction ratio.

The differential portion 32 transmits the torque output from the motor 2 to an output shaft 33. The output shaft 33 is attached to each of the left and right sides of the differential portion 32. For example, the differential portion 32 has a function of transmitting the same torque to the left and right output shafts 33 while absorbing the difference in speed between the left and right drive wheels, that is, the output shafts 33 when the vehicle turns. The output shaft 33 protrudes to the outside of the housing 5. A drive shaft (not shown) connected to a drive wheel of the vehicle is connected to the output shaft 33.

In addition to these, the gear unit 3 may have a parking mechanism (not shown) that locks the vehicle when the operation of the motor unit 1 is stopped.

The housing 5 includes a housing body 51, a bearing holder 52, and a gear unit accommodation portion 53. The housing body 51, the bearing holder 52, and the gear unit accommodation portion 54 are formed of, for example, a conductive material such as iron, aluminum, or an alloy thereof, in other words, metal, but are not limited thereto. Note that the housing body 51, the bearing holder 52, the gear unit accommodation portion 54, and a cover 8 to be described later may be formed of the same material or may be formed of different materials. In order to suppress contact corrosion of dissimilar metals at the contact portion, it is preferable to form the parts with the same material.

The housing body 51 has a first tube portion 511, a partition wall portion 512, and a protrusion 513. The first tube portion 511 is a tubular body extending in the axial direction. The stator core 26 is fixed inside the housing body 51. Further, inside the first tube portion 511, the axial one side part of the shaft 22, the rotor core 23, and the rotor magnet 24 are disposed. That is, the housing 5 accommodates the rotor 21 and the stator 25. The first tube portion 511 has an opening on the axial one side.

The partition wall portion 512 expands radially inward from the axial other side end portion of the first tube portion 511. The partition wall portion 512 is provided with a through hole 514 penetrating along the rotation axis J2. The through hole 514 has a circular cross section, and its center line overlaps with the rotation axis J2. Then, the shaft 22 penetrates the through hole 514. The shaft 22 penetrating the through hole 514 is rotatably supported by the partition wall portion 512 through the second bearing 42 and the fourth bearing 44. The motor unit 1 has bearings 42, 44 that rotatably hold the shaft 22. The second bearing 42 is disposed on the axial one side of the partition wall portion 512, and the fourth bearing 44 is disposed on the axial other side of the partition wall portion 512. As a result, since the shaft 22 is rotatably supported at an intermediate portion in the axial direction, deflection, warpage, and the like of the shaft 22 are curbed when the shaft 22 rotates. The housing 5 accommodates the bearings 42, 44.

The protrusion 513 has a flat plate shape and extends vertically downward from the axial other side of an outer circumferential face of the first tube portion 511. In the motor unit 1 according to the present embodiment, the first tube portion 511, the partition wall portion 512, and the protrusion 513 are formed of a single member. The partition wall portion 512 and the protrusion 513 form a side plate portion 510 that closes the axial one side end portion of the gear unit accommodation portion 54.

A first drive shaft passage hole 515 is formed in the protrusion 513. The first drive shaft passage hole 515 is a hole axially penetrating the protrusion 513. The output shaft 33 penetrates the first drive shaft passage hole 515 in a rotatable state. An oil seal (not shown) is provided between the output shaft 33 and the first drive shaft passage hole 515 to curb leakage of the lubricating oil CL. An axle (not shown) that rotates the wheel is connected to the tip end of the output shaft 33.

The bearing holder 52 expands in the radial direction. The bearing holder 52 is fixed to the axial one side of the first tube portion 511. While the bearing holder 52 can be fixed to the first tube portion 511 with a screw, for example, the method is not limited thereto, and a method of firmly fixing the bearing holder 52 to the first tube portion 511, such as screwing or press-fitting, can be widely used.

As a result, the bearing holder 52 is electrically connected to the housing body 51. Here, the term "two members are electrically connected" includes a case where the two members are physically in contact with each other and can be electrically conducted, and also includes a case where the two members are close to each other to an extent of being substantially at the same potential. That is, electrically connected members have the same or substantially same potential. Hereinafter, in a case where there is electrical connection, a similar configuration is assumed. In the motor unit 1 of the present embodiment, the housing body 51 and the bearing holder 52 have the same potential.

Additionally, the first tube portion 511 and the bearing holder 52 are in close contact with each other. Here, close contact means to have such a sealing property that the lubricating oil CL inside the housing 5 does not leak to the outside and that foreign matters such as external water, dust, and the like do not enter. Close contact refers to a similar configuration hereinafter.

The bearing holder 52 has an opening 521 recessed from the axial one side face of the bearing holder 52 to the axial other side. That is, the housing 5 has an opening on the axial one side. A through hole 520 penetrating in the axial direction is formed in a bottom face of the opening 521. The center of the through hole 520 coincides with the rotation axis J2, and the shaft 22 penetrates the through hole 520. The axial one side end portion of the shaft 22 is disposed inside the opening 521.

The first bearing 41 is disposed on the axial other side of the bearing holder 52. The housing 5 accommodates the bearing 41. The shaft 22 penetrating the through hole 520 is rotatably supported by the bearing holder 52 through the first bearing 41. The bearing 41 rotatably holds the shaft 22.

The resolver stator 281 of the resolver 28 is fixed to the inside of the opening 521. That is, the resolver stator 281 is fixed to the bearing holder 52. When the resolver stator 281 is disposed in the bearing holder 52, the center line thereof coincides with the rotation axis J2. Then, the resolver stator 281 is fixed to the bearing holder 52 by a screw (not shown). Note that the fixing of the resolver stator 281 to the bearing holder 52 is not limited to a screw, and a fixing method, such as press-fitting and bonding, that can firmly fix the resolver stator 281 to the bearing holder 52 can be widely used.

In the motor unit 1, the shaft 22 penetrates the through hole 514 at the axial other side relative to the rotor core 23, and penetrates the through hole 520 at the axial one side in relative to the rotor core 23. Then, both sides of the shaft 22 across the rotor core 23 in the axial direction are rotatably supported by the housing 5 through the first bearing 41 and the second bearing 42. At this time, the shaft 22 is rotatable about the rotation axis J2.

The cover 8 is attached to the axial one side of the bearing holder 52. The cover 8 covers the axial one side of the opening 521 of the bearing holder 52, and is in close contact with the bearing holder 52. That is, the motor unit 1 has the cover 8 that closes the opening and is fixed to the housing 5. Additionally, the bearing holder 52 and the cover 8 are electrically connected. For this reason, the cover 8 and the housing body 51 have the same potential.

The cover 8 has an accommodation portion 80. The accommodation portion 80 protrudes from the axial one side outer face to the axial one side, and is recessed from the axial other side outer face to the axial one side. The accommodation portion 80 accommodates the ring brush 6 (annular member) to be described later. The detailed configuration of the cover 8 will be described later.

A region that is enclosed by covering the opening 521 of the bearing holder 52 with the cover 8 and fixing the cover 8 to the bearing holder 52 is an accommodation space 55. In a state where the stator 25 of the motor 2 is accommodated in the first tube portion 511, the bearing holder 52 is attached to the axial one side of the first tube portion 511, and the cover 8 is attached to the axial one side of the bearing holder 52. As a result, the axial one side end portion of the shaft 22 is accommodated in the accommodation space 55. Then, a contacted portion 61 is formed at the axial one side end portion of the shaft 22. That is, the housing 5 has the accommodation space 55 in which the contacted portion 61 of the shaft 22 is accommodated. Further, the accommodation space 55 is formed between the cover 8 and the bearing holder 52.

The ring brush 6 and the resolver 28 are disposed side by side along the rotation axis J2 in the accommodation space 55. At this time, the ring brush 6 and the contacted portion 61 provided at the axial one side end portion of the shaft 22 face each other in the radial direction. Details of the ring brush 6 and the contacted portion 61 will be described later.

A cover member 56 (see FIG. 2) is attached to the axial one side end portion of the shaft 22. The cover member 56 is disposed on the axial one side relative to the resolver rotor 282. The cover member 56 covers the resolver rotor 282 from the axial one side. The cover member 56 is fixed between the resolver rotor 282 fixed to the shaft 22 and the contacted portion 61, and covers part of the resolver rotor 282 from the axial one side. By covering part of the resolver rotor 282 with the cover member 56, it is possible to curb intrusion of wear powder or the like of the ring brush 6 or the contacted portion 61 into the resolver 28. As a result, the motor unit 1 can be driven stably for a long period of time.

The gear unit accommodation portion 54 has a recessed shape that is open to the axial one side. The gear unit accommodation portion 54 has a second tube portion 541 and a blockage unit 542. The axial one side end portion of the second tube portion 541 is attached to the side plate portion 510. The second tube portion 541 has a shape overlapping an outer edge portion of the side plate portion 510 in the axial direction. The second tube portion 541 is fixed to the side plate portion 510 while being in close contact with and in electrical contact with the side plate portion 510.

The second tube portion 541 is fixed to the side plate portion 510 by screwing, for example, but the method is not limited thereto. For example, a fixing method capable of firmly fixing the second tube portion 541 to the side plate portion 510, such as welding or press-fitting, can be widely used. An opening of the gear unit accommodation portion 54 is covered by the side plate portion 510.

The second tube portion 541 and the blockage unit 542 are formed of a single member. The blockage unit 542 has a plate shape extending radially inward from the axial other side end portion of the second tube portion 541. A space surrounded by the second tube portion 541, the blockage unit 542, and the side plate portion 510 is the gear unit accommodation space 502. The axial other side end portion of the shaft 22 is rotatably supported by the blockage unit 542 through the third bearing 43. The bearing 43 rotatably holds the shaft 22. The housing 5 accommodates the bearing 43.

A second drive shaft passage hole 543 is formed in the blockage unit 542. The second drive shaft passage hole 543 is a hole axially penetrating the blockage unit 542. The output shaft 33 penetrates the second drive shaft passage hole 543 in a rotatable state. An oil seal (not shown) is provided between the output shaft 33 and the second drive shaft passage hole 543 to curb leakage of the lubricating oil CL. An axle (not shown) that rotates the wheel is connected to the tip end of the output shaft 33. Note that the output shaft 33 rotates about a differential axis J5.

The inside of the housing 5 is filled with the lubricating oil CL for lubricating gears and bearings of the gear unit 3. In the motor unit 1, the oil is also used for cooling the motor 2. That is, the lubricating oil CL for lubricating the motor unit 1 is a coolant for cooling the motor.

As illustrated in FIG. 1, the lubricating oil CL is stored in a lower region of the gear unit accommodation space 502. That is, a coolant (lubricating oil CL) for cooling the stator 25 is stored inside the housing 5. Part of the differential portion 32 is immersed in the lubricating oil CL stored in the lower region of the gear unit accommodation space 502. The lubricating oil CL stored in the lower region of the gear unit accommodation space 502 is taken up by the operation of the differential portion 32 and diffused into the gear unit accommodation space 502. The oil diffused into the gear unit accommodation space 502 is supplied to each gear disposed inside the gear unit accommodation space 502 and used for lubrication. Additionally, part of the lubricating oil CL diffused into the gear unit accommodation space 502 is also supplied to each bearing and used for lubrication.

As illustrated in FIG. 1, an oil reserve tray 57 is disposed in an upper region of the gear unit accommodation space 502. The oil reserve tray 57 opens upward. The taken lubricating oil CL moves upward in the gear unit accommodation space 502 and flows into the oil reserve tray 57.

The lubricating oil CL accumulated in the oil reserve tray 57 flows into the hollow portion 221 of the shaft 22 from the inlet 220 of the shaft 22 at the axial other side end portion through an oil supply path (not shown). The lubricating oil CL in the hollow portion 221 of the shaft 22 flows to the axial one side. The lubricating oil CL having flowed through the hollow portion 221 is sprayed toward the stator 25. As a result, the lubricating oil CL cools the stator 25.

Since the shaft 22 has a tubular shape, even when the lubricating oil CL is caused to flow into the hollow portion 221 of the shaft 22, the lubricating oil CL can be drawn from the inlet 220 by negative pressure generated by the airflow flowing out to the axial one side during rotation of the shaft 22. As a result, the lubricating oil CL can be supplied to the entire motor 2, and the motor 2 can be cooled stably. Hence, the motor 2 can be driven stably.

The motor unit 1 has a coolant circulation unit 7 that circulates the lubricating oil CL. The coolant circulation unit 7 includes a pipe portion 71, a pump 72, an oil cooler 73, and a motor oil reservoir 74.

The pipe portion 71 is a pipe formed in the housing 5. The pipe portion 71 connects the pump 12 and the motor oil reservoir 74 disposed inside the first tube portion 511, and supplies the lubricating oil CL to the motor oil reservoir 74. The pump 72 sucks the lubricating oil CL stored in the lower region of the gear unit accommodation space 502. The pump 72 is an electric pump, but is not limited thereto. For example, the motor unit 1 may be driven using part of the output of the output shaft 33.

The oil cooler 73 is disposed between the pump 72 of the pipe portion 71 and the motor oil reservoir 74. That is, the lubricating oil CL sucked by the pump 72 is sent to the motor oil reservoir 74 passing the oil cooler 73 and through the pipe portion 71. For example, a refrigerant such as water supplied from the outside is supplied to the oil cooler 73. Then, heat is exchanged between the refrigerant and the lubricating oil CL to lower the temperature of the lubricating oil CL. Note that while the oil cooler 73 used herein is a liquid-cooled type using a refrigerant, the oil cooler 73 is not limited thereto, and may be a so-called air-cooled type that cools with traveling air of the vehicle. By using the oil cooler 73, the temperature of the lubricating oil CL supplied to the motor oil reservoir 74 can be lowered, and the cooling efficiency of the motor 2 can be enhanced.

The motor oil reservoir 74 is a tray disposed in the upper region of the motor accommodation space 501 and opened upward. More specifically, the motor oil reservoir 74 is disposed vertically above the stator 25 in the motor accommodation space 501. A dropping hole is formed in a bottom portion of the motor oil reservoir 74, and the motor 2 is cooled by dropping the lubricating oil CL from the dropping hole. The dropping hole is formed above the coil end 271 of the coil 27 of the stator 25, for example, and the coil 27 is cooled by the lubricating oil CL.

The ring brush 6 is in contact with the contacted portion 61 formed at the axial one side end portion of the shaft 22. The contacted portion 61 is made of a material having higher conductivity than a bearing contact portion 222 in contact with the inner ring of the bearing of the shaft 22. That is, the conductivity of the contacted portion 61 is higher than the conductivity of the bearing contact portion 222 in contact with the bearing 41 of the shaft 22. The contacted portion 61 is in contact with a brush portion 63 described later of the ring brush 6.

By making the conductivity of the contacted portion 61 higher than that of the bearing contact portion 222 in contact with the bearing 41 of the shaft 22, most of the axial current generated in the shaft 22 can flow to the ring brush 6 in contact with the contacted portion 61. As a result, a potential difference between the inner ring and the outer ring of the bearing can be curbed, and electric corrosion of the bearing can be curbed effectively. Note that although the first bearing 41 is described, the potential difference between the inner ring and the outer ring is similarly curbed and electric corrosion is curbed in other bearings as well.

Note that the contacted portion 61 is a conductive film of silver, copper, or the like, and is formed by applying a metal paste, for example. Note that the contacted portion 61 may be formed by a film forming method such as plating or vapor deposition, in addition to coating. The electric corrosion of the bearing will be described later. Additionally, when electrically conducted sufficiently to the ring brush 6, the contacted portion 61 may be part of the shaft 22.

The motor unit 1 has an annular shape when viewed from the axial direction, and has the ring brush 6 (annular member) provided independently from the bearings 41 to 44. The annular member (ring brush 6) is a member different from the bearing. The ring brush 6 has a conductive ring 62 and the brush portion 63. The conductive ring 62 has an annular shape and is made of a conductive material such as metal. That is, the annular member (ring brush 6) has the conductive ring 62 that has an annular shape and has conductivity. The conductive ring 62 is disposed inside the accommodation portion 80 of the cover 8. The conductive ring 62 is fixed to the accommodation portion 80 by press fitting. That is, the annular member (ring brush 6) is fixed to the accommodation portion 80 by press fitting. As a result, no adhesive is required for fixing the annular member, and it is possible to reduce materials and eliminate the man-hours for managing the adhesive. However, the fixing method is not limited to this, and a method capable of firmly fixing the conductive ring 62 to the accommodation portion 80, such as adhesion or welding, can be widely adopted.

The brush portion 63 is a material that has conductivity and can be bent in the circumferential direction. The brush portion 63 is fixed to an inner circumferential face of the conductive ring 62 and is electrically connected to the conductive ring 62. That is, the ring brush 6 is electrically connected to the housing 5 via the cover 8. The annular member (ring brush 6) has the brush portion 63 that is fixed to the radial inner circumferential face of the conductive ring 62 and has conductivity and is bendable in the circumferential direction.

The brush portion 63 protrudes radially inward. The length from the inner circumferential face of the conductive ring 62 to the radially inward tip end of the brush portion 63 is longer than the radial distance between the conductive ring 62 and the contacted portion 61. For this reason, the radially inward tip end of the brush portion 63 elastically bends and is in contact with the contacted portion 61.

Since the contacted portion 61 is formed on the outer circumferential face of the shaft 22, the radially inward tip end of the brush portion 63 continues to contact the contacted portion 61 even when the shaft 22 moves in the axial direction. That is, even when the shaft 22 moves in the axial direction, the conducting state between the shaft 22 and the housing 5 is maintained.

In the present embodiment, a wire member made of carbon fiber is used as the brush portion 63, but the present invention is not limited thereto. A wire member made of a member that is elastically deformable and has conductivity can be widely used. Additionally, the brush portion is not limited to the wire member, and may have a film shape having a width in the rotation axis J2 direction and a thickness in the circumferential direction.

As illustrated in FIG. 1, the axial one side end portion of the shaft 22 is rotatably supported by the bearing holder 52 through the first bearing 41. The shaft 22 penetrates the through hole 520 and protrudes to the axial one side. Then, the resolver rotor 282 of the resolver 28 is attached to the axial one side of the shaft 22 relative to the through hole 520.

When the ring brush 6 is attached to the accommodation portion 8 of the cover 8, the radially inward tip end of the brush portion 63 of the ring brush 6 is in contact with the contacted portion 61 of the outer circumferential face of the shaft 22. That is, the outer circumferential face of the shaft 22 is in contact with the brush portion 63. Since the brush portion 63 deforms elastically, the radially inward tip end of the brush portion 63 deforms along the contacted portion 61 and is in contact with the contacted portion 61, so that the brush portion 63 and the contacted portion 61 are electrically connected. As a result, the shaft 22 and the ring brush 6 are electrically connected.

Since the brush portion 63 is made of an elastically deformable material, the electrical connection between the shaft 22 and the ring brush 6 is maintained even when the shaft 22 rotates. For this reason, the shaft 22 and the housing 5, that is, the inner ring attached to the shaft 22 and the outer ring attached to the housing 5 of each of the first bearing 41 to the fourth bearing 44 have the same potential, and electric corrosion of the bearing due to discharge generated based on the potential difference is curbed. As a result, variations in the rotation of the shaft 22 are suppressed, and the motor unit 1 can be driven stably for a long period of time. In other words, the life of the motor unit 1 can be prolonged.

Additionally, since the rotor 21 and the stator 25 of the motor 2 can be cooled stably with the lubricating oil CL, a decrease in output due to a temperature rise of the motor 2 can be curbed. That is, in the motor unit 1, a decrease in output can be curbed over a long period of time.

As illustrated in FIG. 1, the inner diameter of the axial one side end portion of the hollow portion 221 of the shaft 22 may be formed smaller than the inner diameter of the axial other side T. A step is formed at the axial one side of the hollow portion 221. As a result, even when the shaft 22 is inclined so that the axial one side is lower than the axial other side, the flow of the lubricating oil CL is curbed by the step formed at the axial one side of the shaft 22. As a result, it is possible to prevent the lubricating oil CL from entering into a space between the ring brush 6 and the contacted portion 61 from the axial one side of the shaft 22 to form an oil film, and to curb an increase in electric resistance between the housing 5 and the shaft 22 due to the oil film.

Next, the first embodiment of the cover 8 will be described. Hereinafter, for various embodiments of the cover 8, an alphabet is added to "8" as a code for convenience.

Figure 3:
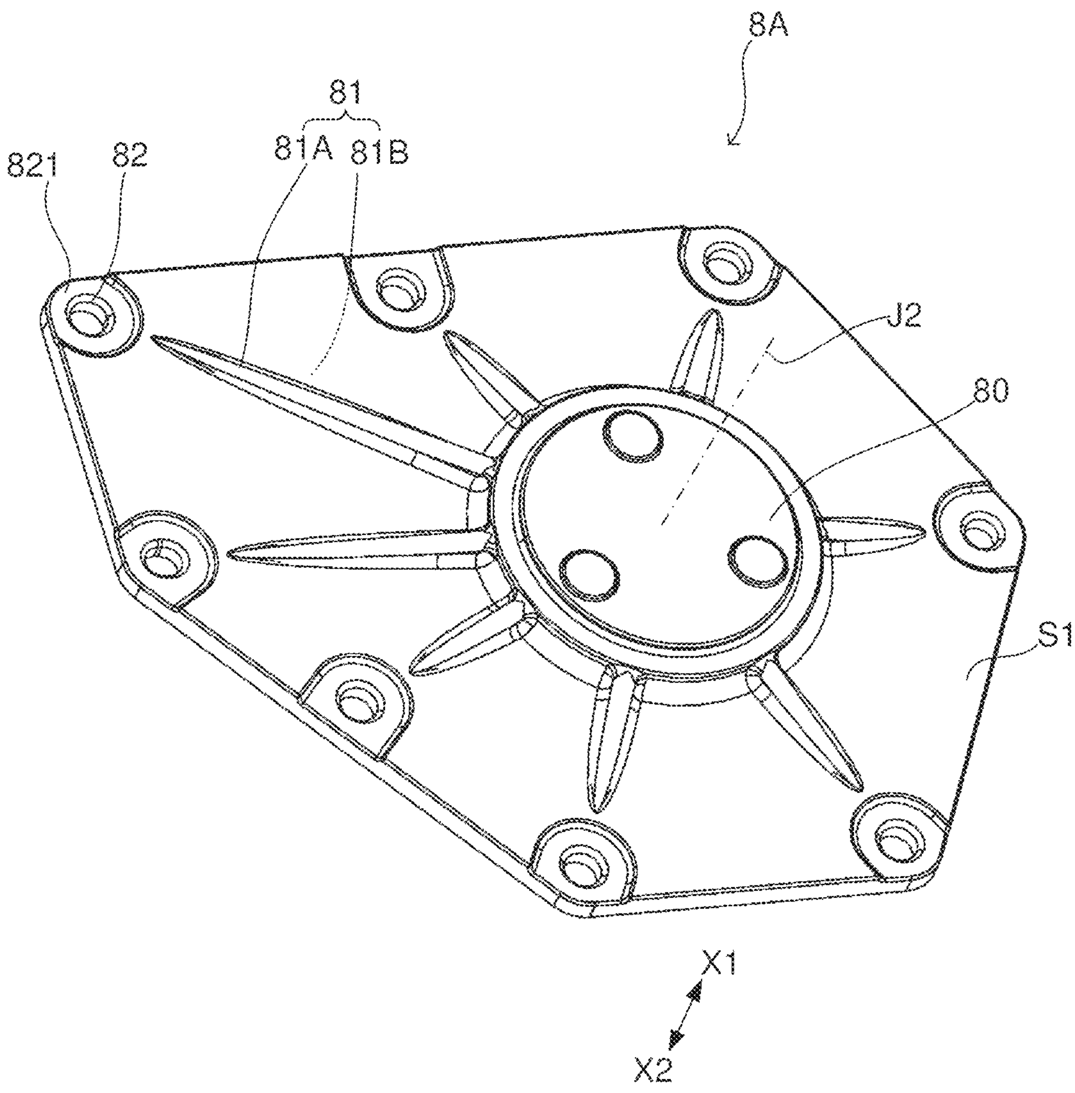
FIG. 3 is a perspective view of the cover according to the first embodiment when viewed from the axial one side.
Figure 4:
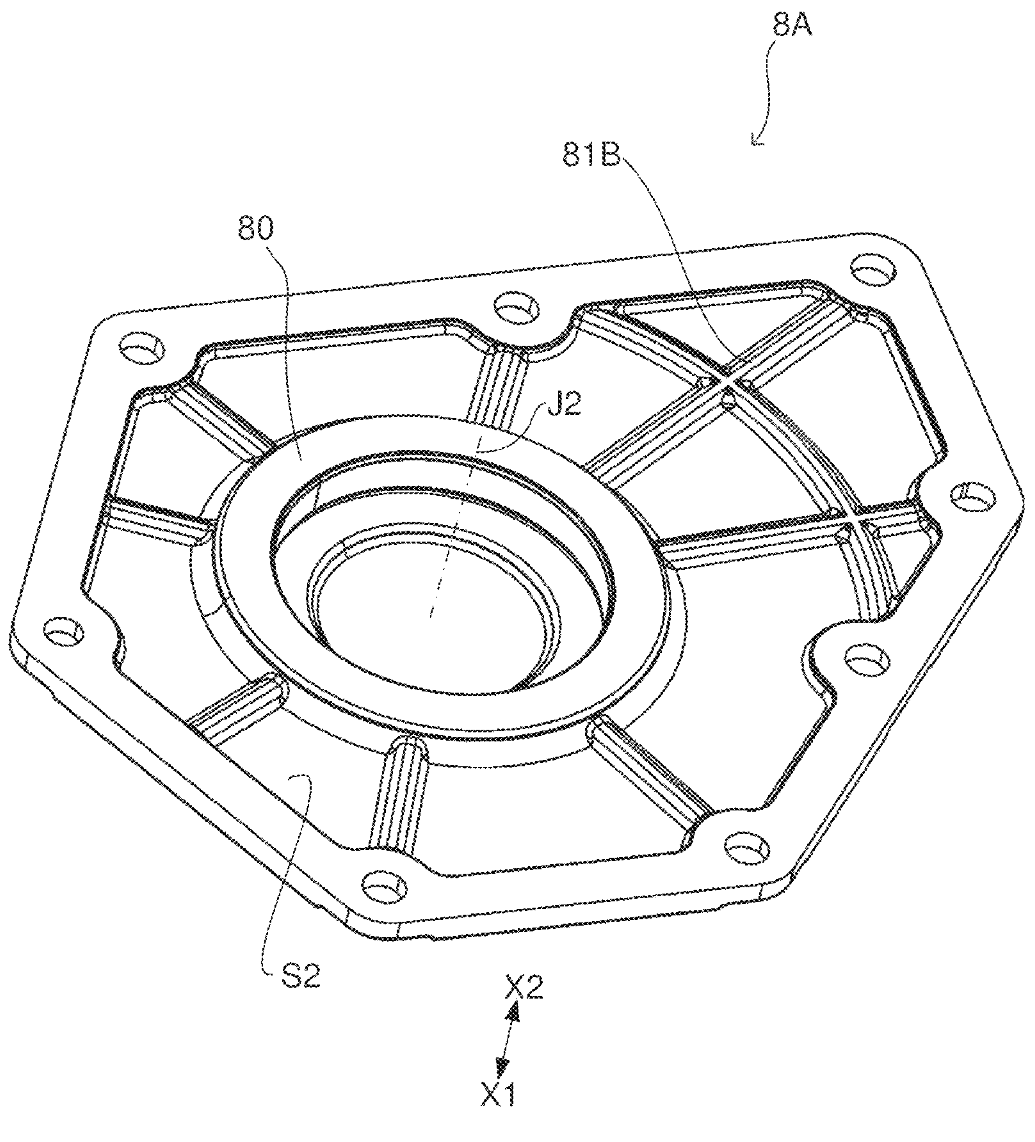
FIG. 4 is a perspective view of the cover according to the first embodiment when viewed from the axial other side.

FIG. 3 is a perspective view of a cover 8A according to the first embodiment when viewed from the axial one side. FIG. 4 is a perspective view of the cover 8A according to the first embodiment when viewed from the axial other side. The cover 8A shown in FIGS. 3 and 4 is formed by die casting and is made of a material such as aluminum.

The cover 8A has an accommodation portion 80 that protrudes from an axial one side outer face S1 to the axial one side and is recessed from an axial other side outer face S2 to the axial one side. The accommodation portion 80 is formed in a cylindrical shape in which the axial one side is closed around the rotation axis J2.

As shown in FIGS. 3 and 4, the cover 8 has a plurality of ribs 81. One rib 81 has a one side protrusion 81A and an other side protrusion 81B. The one side protrusion 81A and the other side protrusion 81B are disposed so as to face each other in the axial direction. The one side protrusion 81A protrudes from the axial one side outer face S1 of the cover 8 in the axial direction to the axial one side. The other side protrusion 81B protrudes from the axial other side outer face S2 of the cover 8 to the axial other side. In this way, since the one rib 81 is formed of the one side protrusion 81A and the other side and the other side protrusion 81B, the axial thickness of the rib 81 can be increased and the strength of the cover 8 can be improved. Further, since the cover 8 is formed by die casting, the one side protrusion 81A and the other side and the other side protrusion 81B can be formed. In this case, since the one side protrusion 81A and the other side and the other side protrusion 81B are each solid, the strength of the rib 81 can be improved.

The one side protrusion 81A and the other side protrusion 81B extend radially outward from the outer circumference of the accommodation portion 80. That is, the rib 81 extends radially outward from the outer circumference of the accommodation portion 80. In the cover 8A shown in FIGS. 3 and 4, the number of ribs 81 is eight as an example, but the number of ribs 81 may be plural other than eight or one. That is, the cover 8A has one or more ribs 81 that protrude from the axial one side outer face S1 of the cover 8A to the axial one side and are disposed radially outward of the accommodation portion 80 when viewed from the axial direction. The plurality of ribs 81 extends radially from the accommodation portion 80.

Cover 8A has a plurality of fixing points 82. The fixing points 82 are disposed along the outer edge of the cover 8A. Here, the number of fixing points 82 is eight, which is the same as the number of ribs 81. The number of fixing points 82 may be one when the number of ribs 81 is one. That is, the number of one or more ribs 81 is the same as the number of the one or more fixing points 82.

In the cover 8A, the fixing point 82 is a through hole through which a bolt penetrates in the axial direction. The cover 8A is fixed to the bearing holder 52 by the bolt inserted into the fixing point 82. That is, the cover 8A has one or more fixing points 82 that are fixed to housing 5.

A bolt accommodation portion 821 which is recessed to the axial other side and accommodates the head of the bolt is formed around the fixing point 82 (through hole). As a result, the axial position of the head of the bolt can be lowered, and the motor unit 1 can be miniaturized in the axial direction.

Further, the fixing point is not limited to a fixing point for bolting as described above, and may be a fixing point by welding, adhesion, crimping or the like, for example.

Figure 5:
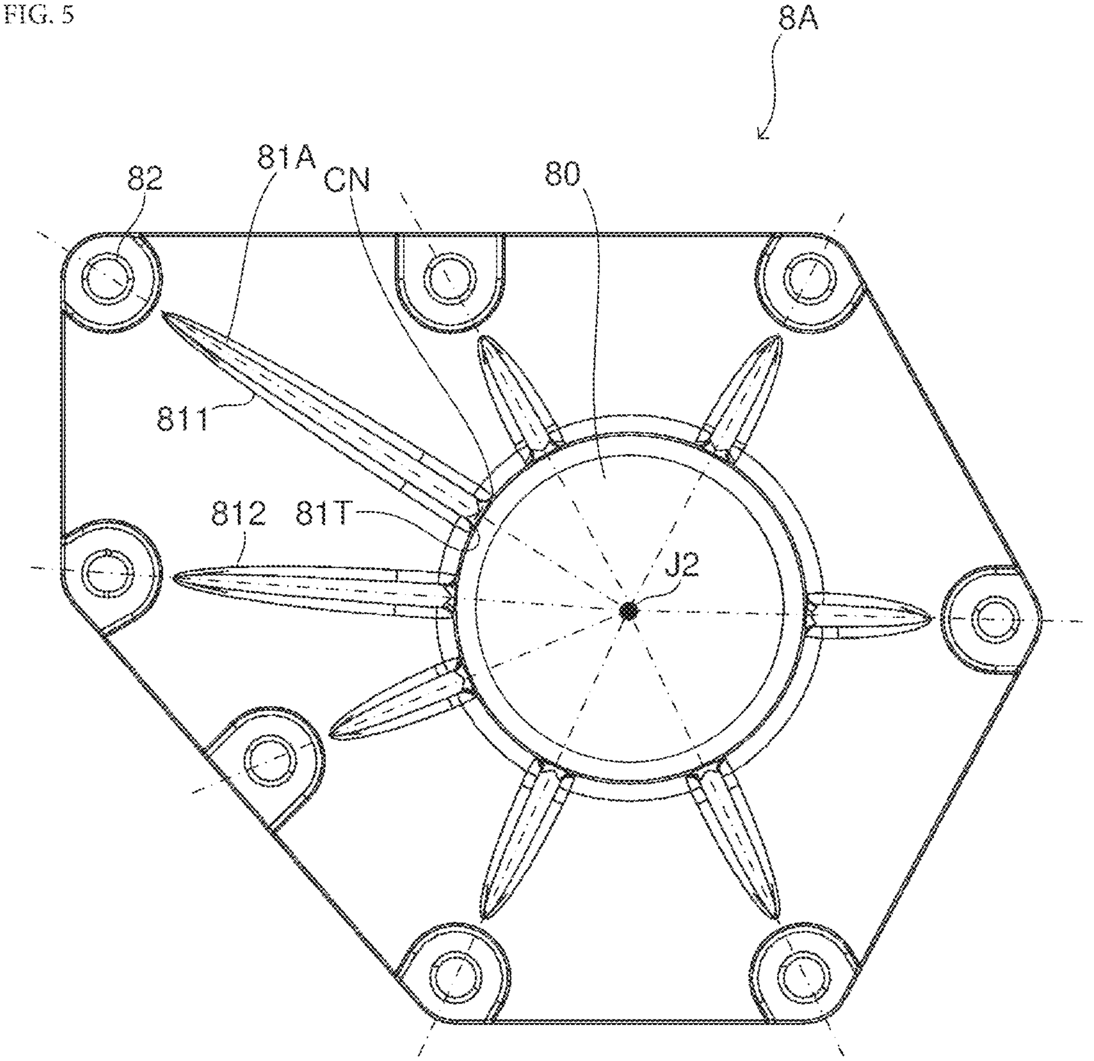
FIG. 5 is a plan view of the cover according to the first embodiment when viewed from the axial one side.

Here, FIG. 5 is a plan view of the cover 8A as viewed from the axial one side. As shown in FIG. 5, each rib 81 (one side protrusion 81A) extends toward a fixing point 82. More specifically, when viewed in the axial direction, a line segment extending from the rotation axis J2 in the radial direction through the width center position of the rib 81 passes through the fixing point 82. That is, the one or more ribs 81 extend outward from the accommodation portion 80. For at least one of the ribs 81, when viewed in the axial direction, the fixing point 82 is formed on an extension line extending outward from the rib 81 in the direction of in which the rib 81 extends.

Vibration is transmitted from the housing 5 to the fixing point 82 of the cover 8A. When the rib 81 is not provided, the transmitted vibration is likely to be transmitted to the ring brush 6 accommodated in the accommodation portion 80 via the cover 8A. As a result, the ring brush 6 vibrates relative to the cover 8A, and noise is likely to be generated. On the other hand, in the present embodiment, since the ribs 81 are provided in the above-described manner, it is possible to suppress the transmission of vibration from the fixing point 82 to the ring brush 6 (annular member) and suppress noise. Further, since the rib 81 is formed of the one side protrusion 81A and the other side protrusion 81B, the transmission of vibration can be further suppressed.

Specifically, the ring brush 6 is used as an annular member accommodated in the accommodation portion 80. Since the vibration transmitted from the cover 8A to the conductive ring 62 is larger than the vibration transmitted from the shaft 22 to the brush portion 63, it is effective to suppress the vibration transmission by the rib 81.

Further, as described above, since the number of ribs 81 is the same as the number of fixing points 82, it is easy to suppress vibration in a well-balanced manner with respect to each fixing point 82, and vibration of the cover 8A is effectively suppressed. The number of ribs 81 does not necessarily have to match the number of fixing points 82.

Further, as shown in FIG. 5, the rib 81 includes a first rib 811 and a second rib 812. A distance from a connection portion CN, of the first rib 811, with the accommodation portion 80 to the fixing point 82 is longer than a distance from the connection portion CN, of the second rib 812, with the accommodation portion 80 to the fixing point 82. The first rib 811 is longer than the second rib 812. When the above distance is long, the vibration of the cover 8A tends to be large, but the vibration can be suppressed by increasing the length of the rib 81. The combination of the first rib 811 and the second rib 812 may be other than the combination of the ribs 81 shown in FIG. 5.

Further, as shown in FIG. 5, the radially inner ends 81T of the ribs 81 adjacent to each other in the circumferential direction do not come into contact with each other. As a result, it is possible to prevent the radially inner ends of the ribs from coming into contact with each other and the contact portion from acting as a vibration source.

Figure 6:
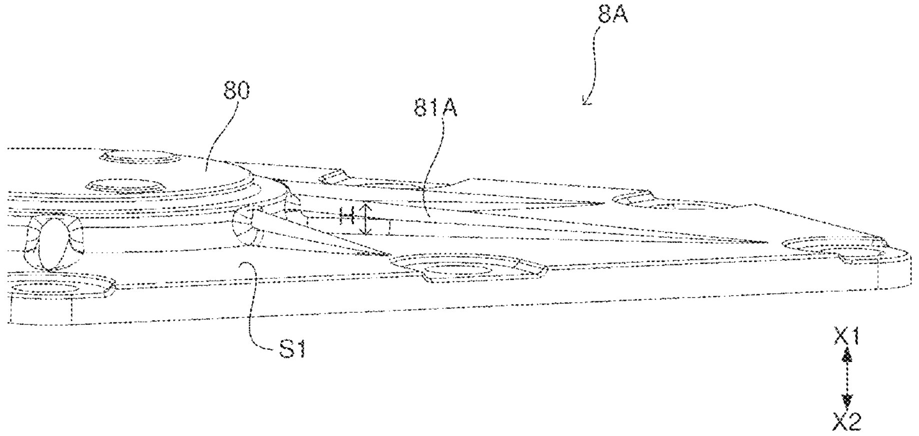
FIG. 6 is a partial perspective view of the cover according to the first embodiment.

Further, as shown in FIG. 6, an axial height H from the axial one side outer face S1 of the rib 81 (one side protrusion 81A) continuously decreases toward an outer side. As a result, it is possible to suppress the warp of the cover 8A when it is formed by die casting.

Figure 7:
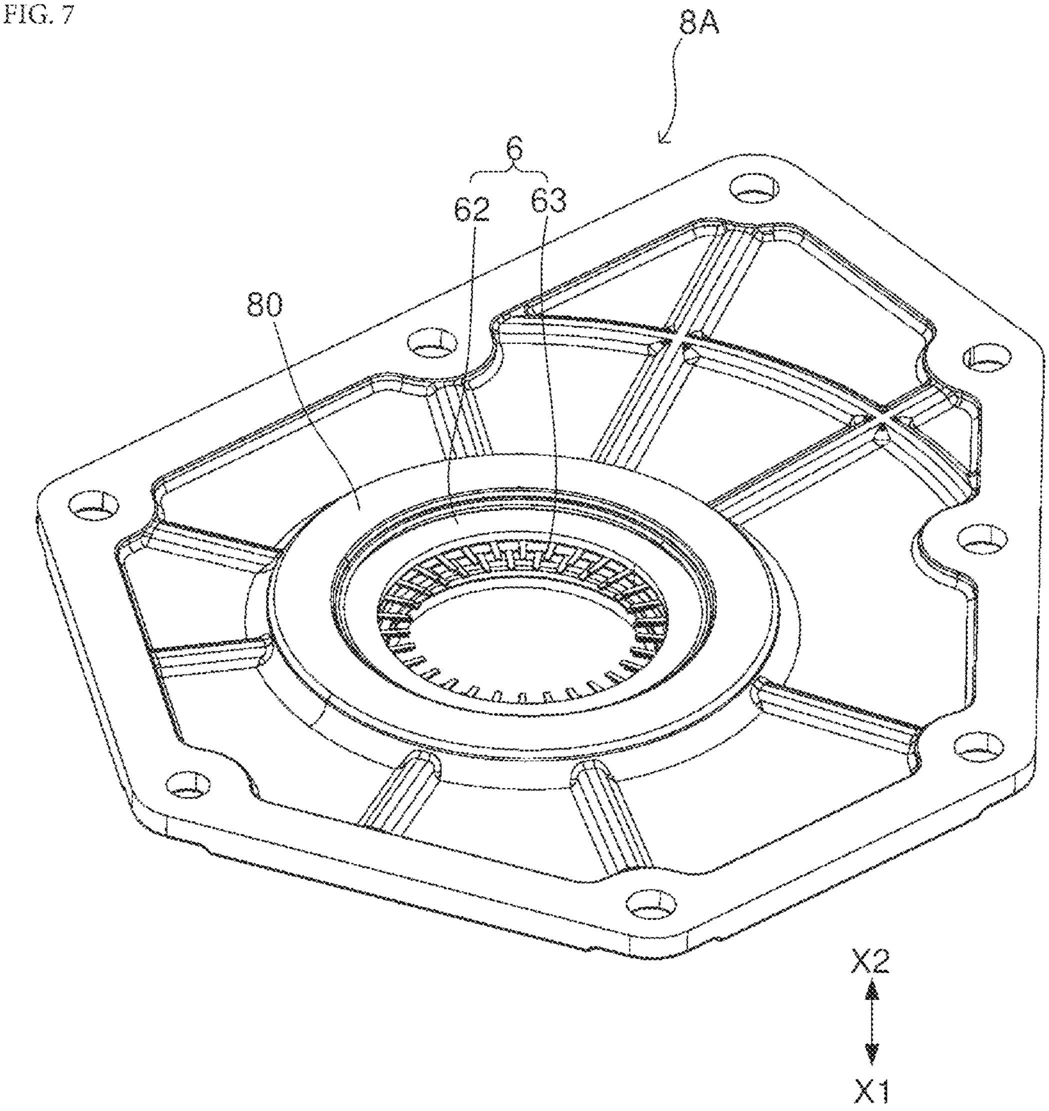
FIG. 7 is a perspective view showing a state in which a ring brush is accommodated in an accommodation portion of the cover according to the first embodiment.
Figure 8:
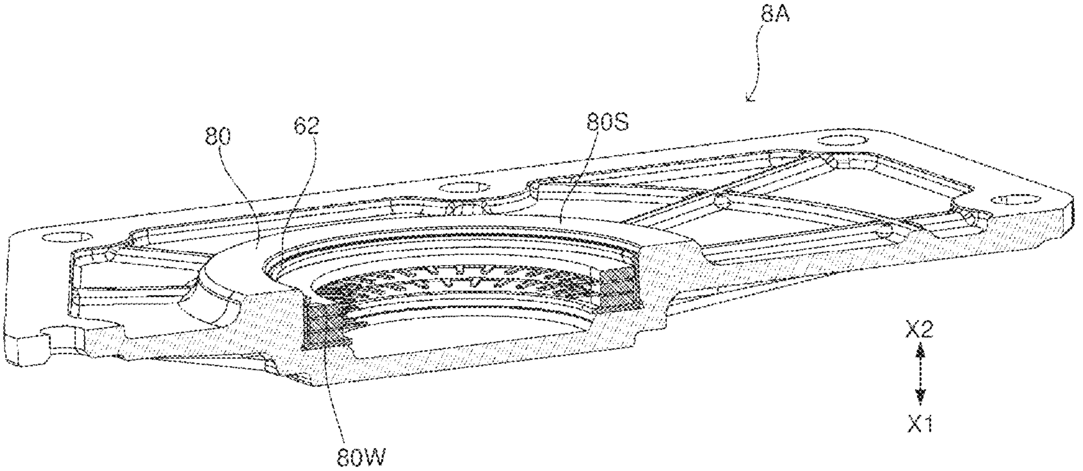
FIG. 8 is a cross-sectional perspective view of the state of FIG. 7.

Here, FIG. 7 is a perspective view showing a state in which the ring brush 6 is accommodated in the accommodation portion 80 of the cover 8A. FIG. 8 is a cross-sectional perspective view in the state of FIG. 7. Note that FIGS. 7 and 8 show a state in which the ring brush 6 is accommodated in the accommodation portion 80 by press fitting.

Figure 9:
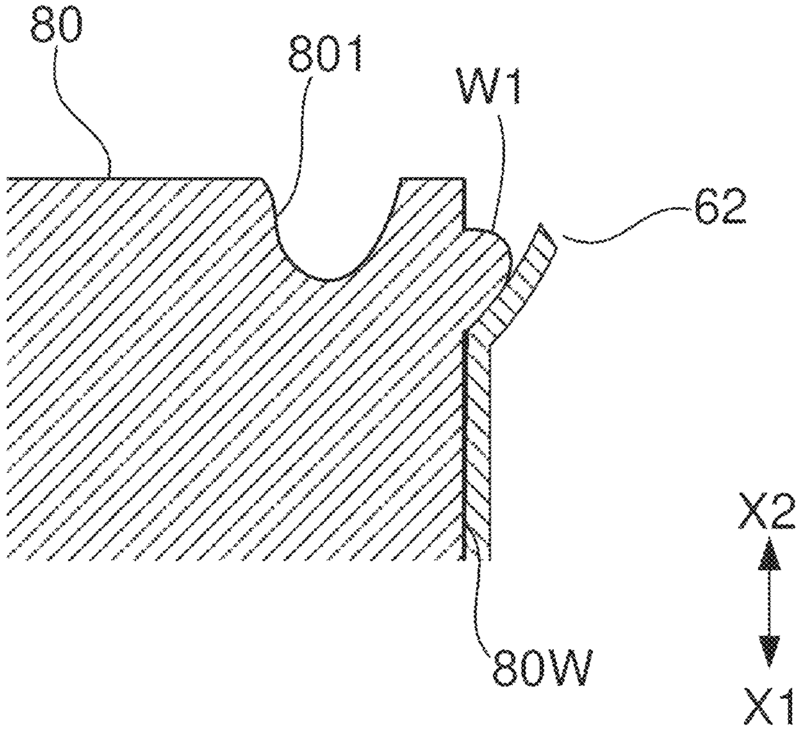
FIG. 9 is a partial schematic cross-sectional view showing a deformed portion.

Further crimping is performed in the state of FIGS. 7 and 8. At this time, at a plurality of locations in the circumferential direction of an axial other side end face 80S of the accommodation portion 80, the axial other side end face 80S is pushed to the axial one side by a punch. As a result, as shown in the schematic cross-sectional view in FIG. 9, a recess 801 is formed by a punch on the axial other side end face 80S, and a deformed portion W1 protruding radially inward is formed at an axial other side end portion of an inner circumferential side wall face 80W of the accommodation portion 80. The deformed portion W1 and the conductive ring 62 of the ring brush 6 come into contact with each other, and the conductive ring 62 is pushed radially inward. As a result, it is possible to prevent the ring brush 6 from coming off in the axial direction. Specifically, when the accommodation portion 80 is formed by die casting, the accommodation portion 80 is thicker in the radial direction, so that the crimping as described above is effective.

The press-fitted ring brush 6 may be disposed on the axial one side relative to the deformed portion W1. As a result, normally, the ring brush 6 does not come into contact with the deformed portion W1, but even when the ring brush 6 moves in the axial direction, it comes into contact with the deformed portion W1, so that the ring brush 6 is prevented from coming off in the axial direction.

That is, the annular member (ring brush 6) can come into contact with the deformed portion W1 due to crimping of the wall face 80W extending in the circumferential direction of the accommodation portion 80. As a result, it is possible to prevent the annular member from coming off in the axial direction.

Further, it is desirable that the recesses 801 by the punch are disposed at equal intervals in the circumferential direction. That is, the plurality of deformed portions W1 is disposed at equal intervals in the circumferential direction. As a result, the removal of the annular member can be further suppressed.

Figure 10:
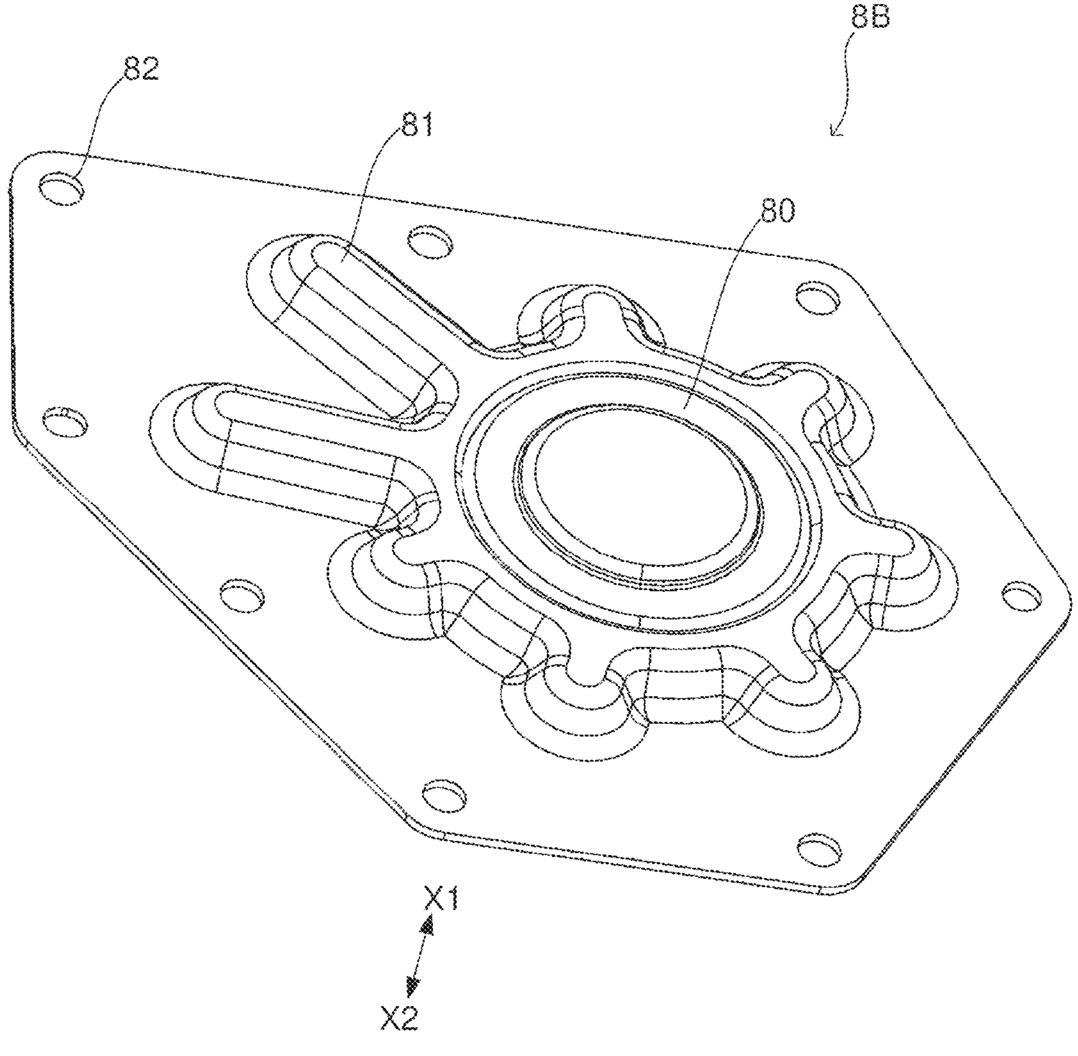
FIG. 10 is a perspective view of the cover according to the second embodiment when viewed from the axial one side.
Figure 11:
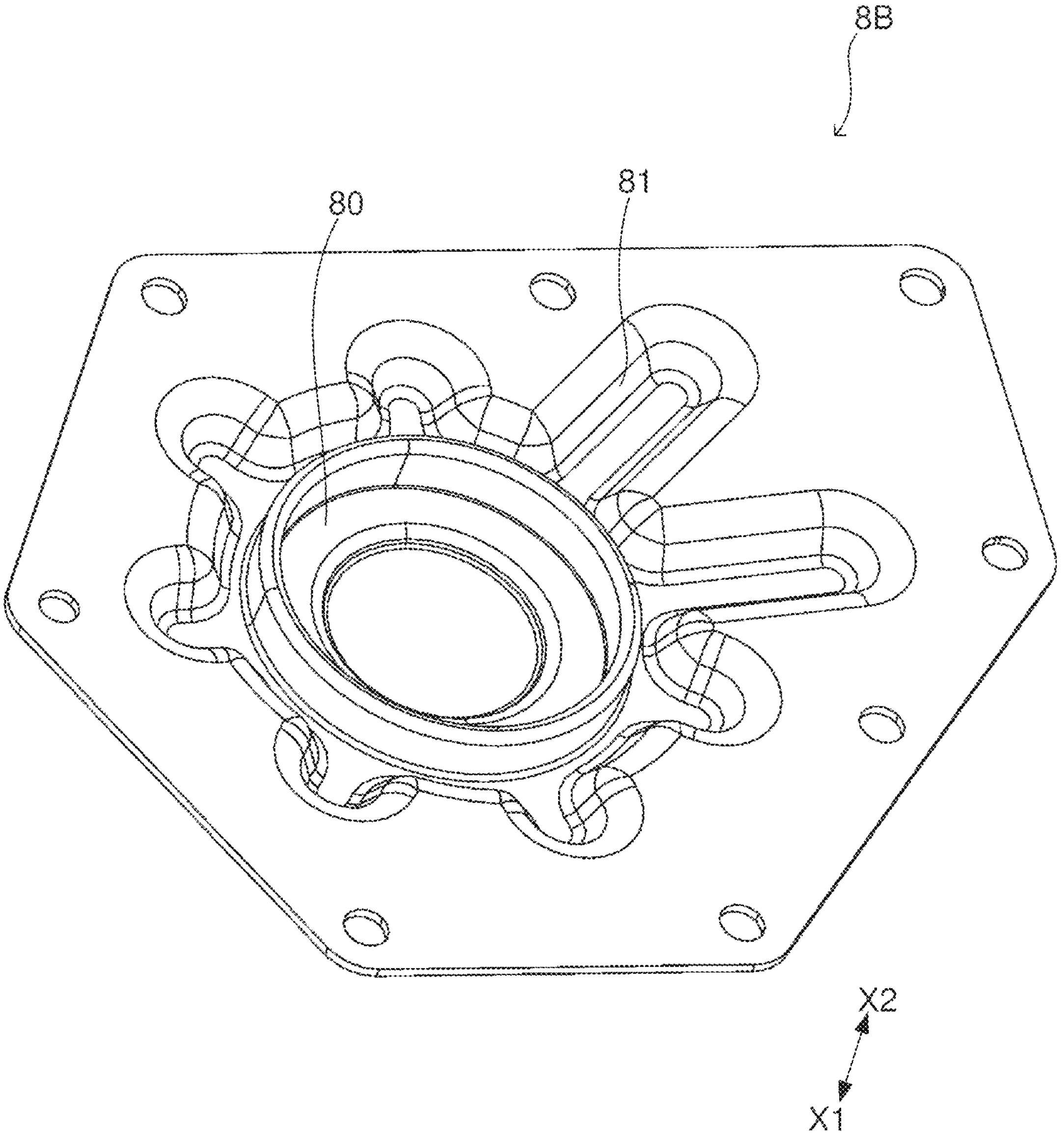
FIG. 11 is a plan view of the cover according to the second embodiment when viewed from the axial other side.

Next, the second embodiment of the cover 8 will be described. FIG. 10 is a perspective view of the cover 8B according to the second embodiment when viewed from the axial one side. FIG. 11 is a perspective view of the cover 8B according to the second embodiment when viewed from the axial other side. The cover 8B shown in FIGS. 10 and 11 is formed by press molding and is made of a material such as iron.

In the cover 8B according to the second embodiment, as in the first embodiment described above, a plurality of ribs 81 extending outward from the accommodation portion 80 is provided. The accommodation portion 80 and the rib 81 are formed by press molding. The accommodation portion 80 protrudes from the axial one side outer face of the cover 8B to the axial one side, and is recessed from the axial other side outer face of the cover 8B to the axial one side. Since the cover 8B is formed by press molding, it is easy to form a structure in which the plate thickness of the cover 8B including the rib 81 is almost constant. That is, the cover 8B is formed by deforming one plate. As a result, the material of the cover 8B can be reduced, and the cost can be reduced.

Figure 12:
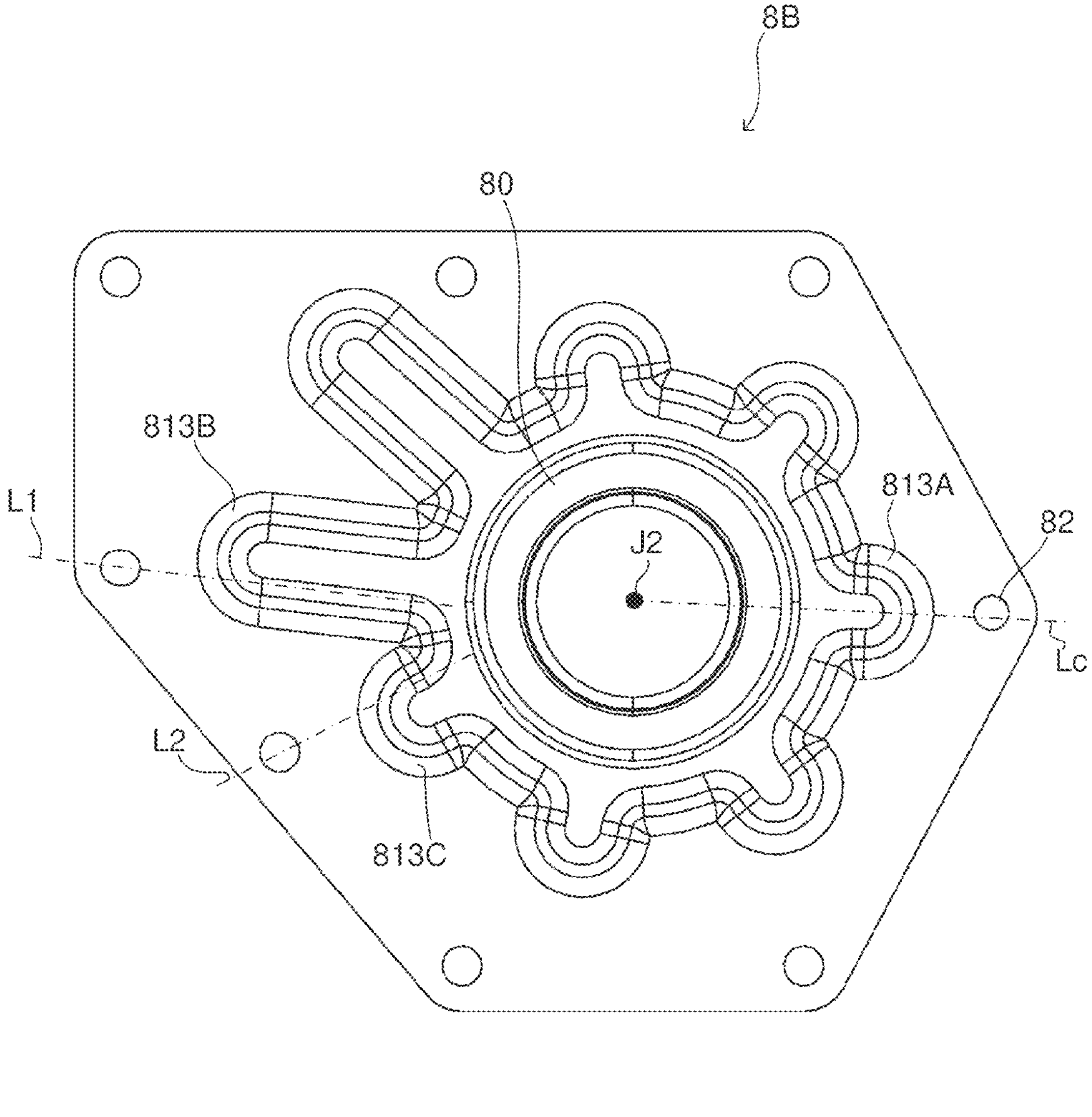
FIG. 12 is a plan view of the cover according to the second embodiment when viewed from the axial one side.

Here, FIG. 12 is a plan view of the cover 8B as viewed from the axial one side. Each of the ribs 813A to 813C shown in FIG. 12 is one of the ribs 81. As shown in FIG. 12, for the rib 813A, when viewed in the axial direction, a line segment Lc extending from the rotation axis J2 in the radial direction through the width center position of the rib 813A passes through the fixing point 82, but for ribs 81 other than this rib, a similar line segment does not pass through the fixing point 82. However, as shown in FIG. 12, for ribs 813B and 813C, when viewed in the axial direction, extension lines L1 and L2 extending outward from the ribs 813B and 813C in a direction in which each of the ribs 813B and 813C extends (direction parallel to the radial direction) pass through the fixing point 82. That is, for the ribs 813A and 813C, when viewed from the axial direction, the fixing points 82 are formed on the extension lines extending outward from the ribs 813A to 813C in the direction in which each of the ribs 813A to 813C extends. With such ribs 813A to 813C, it is possible to suppress the transmission of vibration from the fixing point 82 to the ring brush 6.

Figure 13:
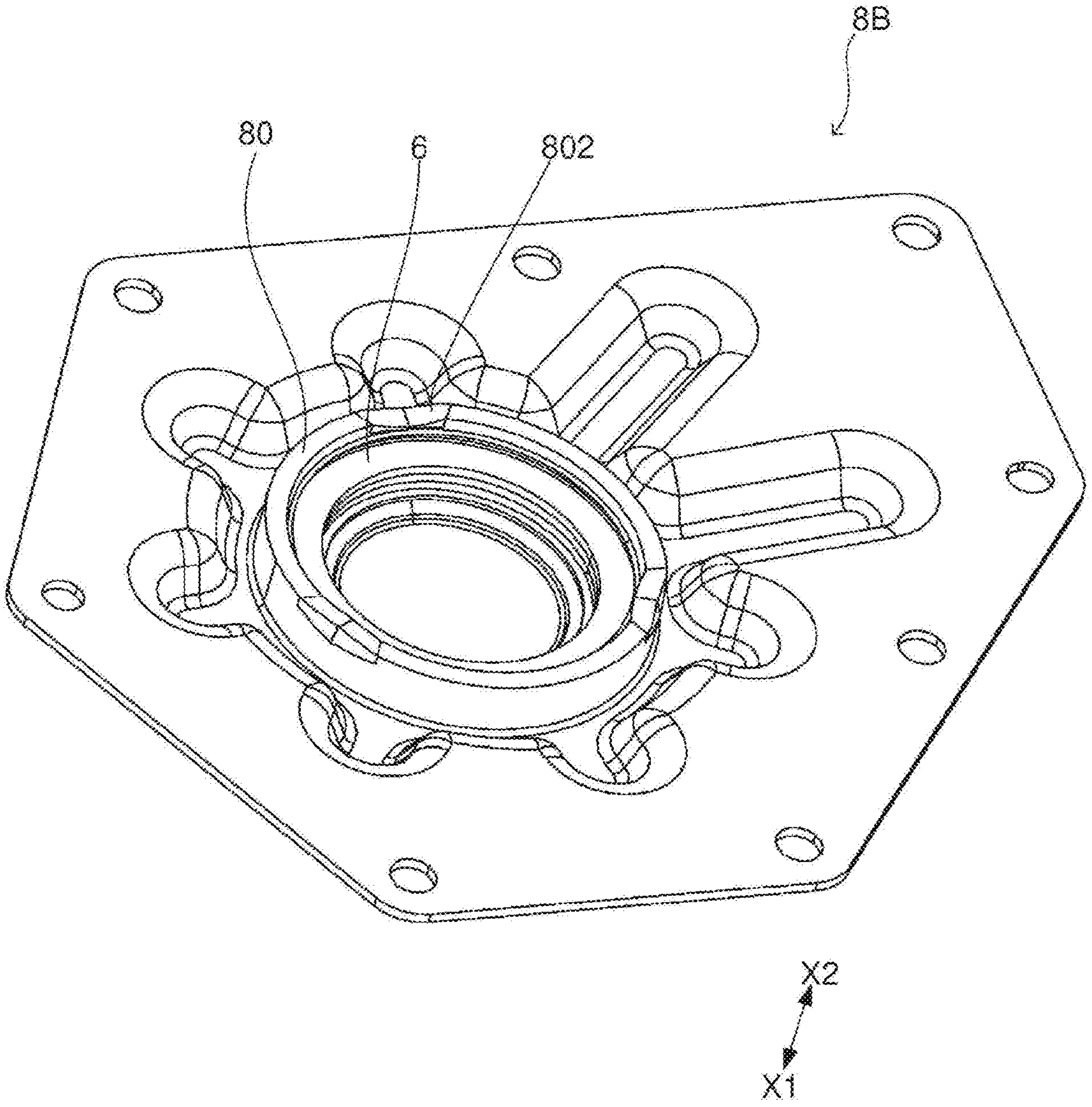
FIG. 13 is a perspective view showing a state in which a ring brush is accommodated in an accommodation portion of the cover according to a second embodiment.
Figure 14:
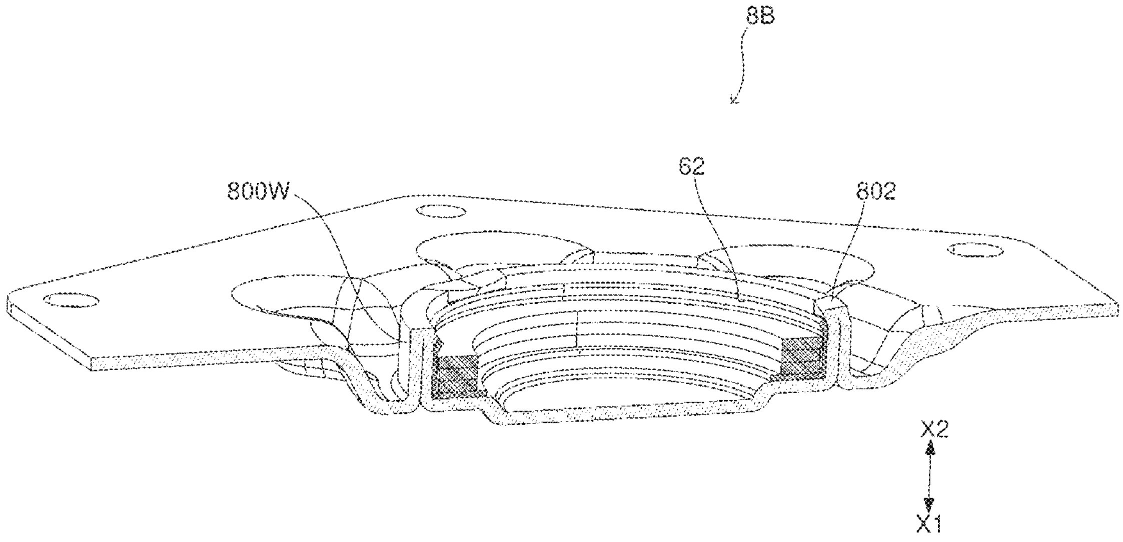
FIG. 14 is a cross-sectional perspective view of the state of FIG. 13.

Here, FIG. 13 is a perspective view showing a state in which the ring brush 6 is accommodated in the accommodation portion 80 of the cover 8B. FIG. 14 is a cross-sectional perspective view in the state of FIG. 13. Note that FIGS. 13 and 14 show a state in which the ring brush 6 is accommodated in the accommodation portion 80 by press fitting and a state in which the accommodation portion 80 is subjected to the crimping described later.

As shown in FIG. 13, a plurality of deformed portions 802 due to crimping is disposed at equal intervals in the circumferential direction at the axial other side end portion of the accommodation portion 80. As shown in FIG. 14, the deformed portion 802 is formed by bending radially inward part of the axial other side end portion of the wall portion 800W, included in the accommodation portion 80, extending in the circumferential direction. The radially inward face of the deformed portion 802 is in contact with the conductive ring 62 of the ring brush 6. As a result, the ring brush 6 is suppressed from coming off in the axial direction. Since the cover 8B is formed by press molding, the radial thickness of the wall portion 800W is thin, and it is easy to bend the wall portion 800W.

The ring brush 6 may be disposed on the axial one side relative to the deformed portion 802. In this case, normally, the ring brush 6 does not come into contact with the deformed portion 802, but even when the ring brush 6 moves in the axial direction, the conductive ring 62 is in contact with the deformed portion 802 to prevent the ring brush 6 from coming off.

That is, the deformed portion 802 is provided at the axial other side end portion of the annular wall portion 800W included in the accommodation portion 80, and is bent radially inward. As a result, when the cover 8 is formed by press molding, the deformed portion 802 can be easily formed.

Figure 15:
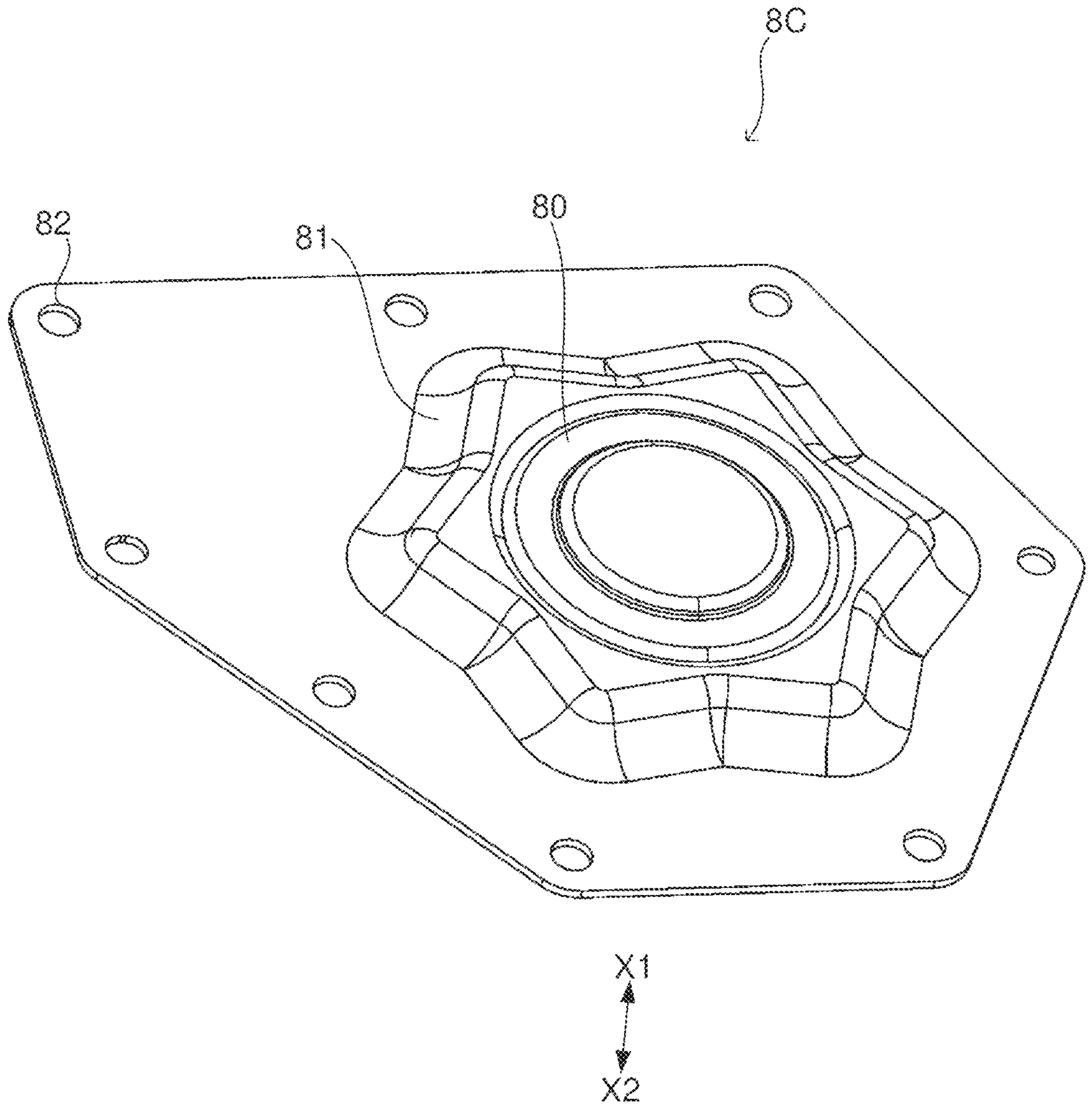
FIG. 15 is a perspective view of the cover according to the third embodiment when viewed from the axial one side.
Figure 16:
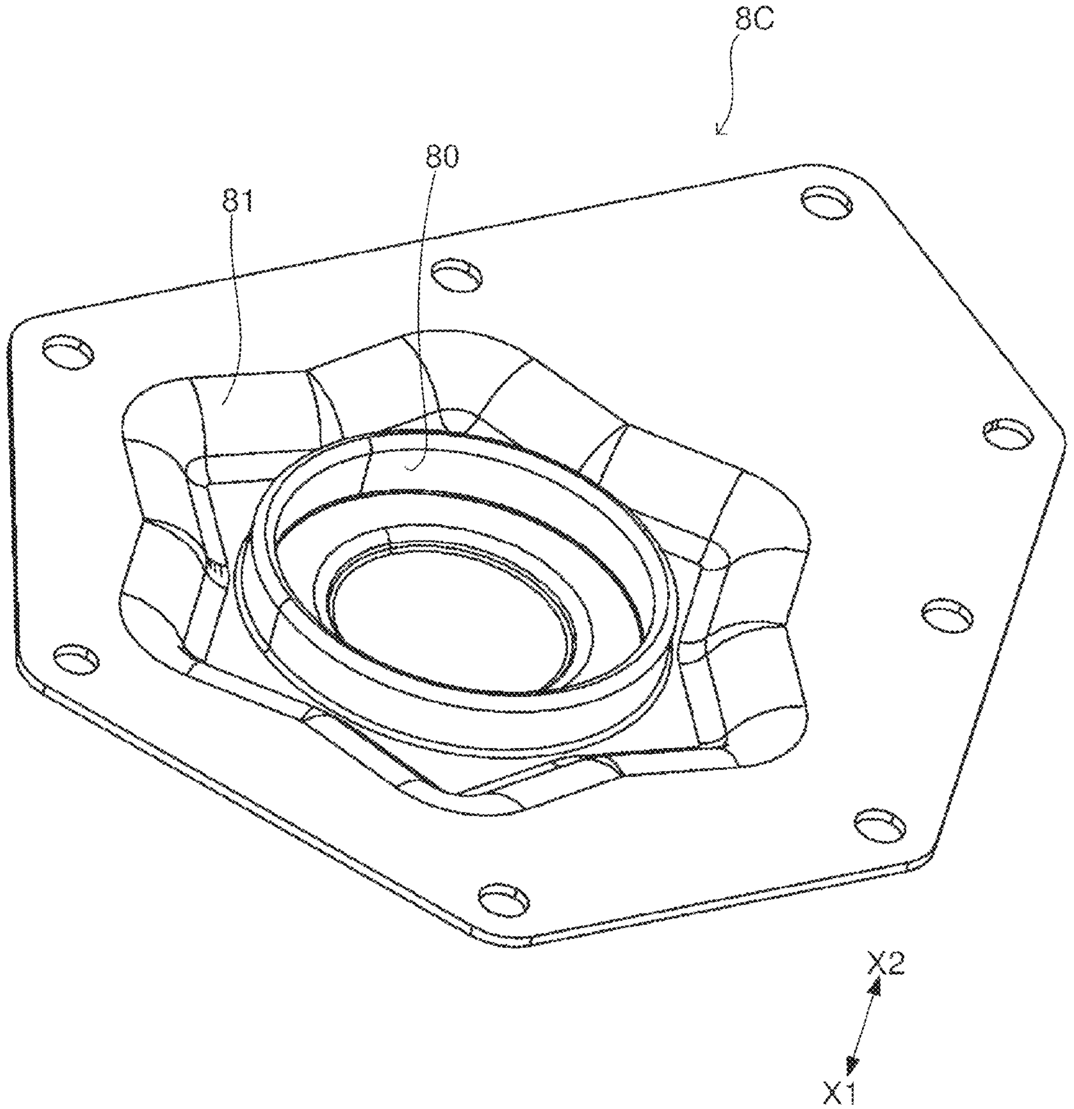
FIG. 16 is a perspective view of the cover according to the third embodiment when viewed from the axial other side.

Next, the third embodiment of the cover 8 will be described. FIG. 15 is a perspective view of a cover 8C according to the third embodiment when viewed from the axial one side. FIG. 16 is a perspective view of the cover 8C according to the third embodiment when viewed from the axial other side. The cover 8C shown in FIGS. 15 and 16 is formed by press molding as in the second embodiment.

Figure 17:
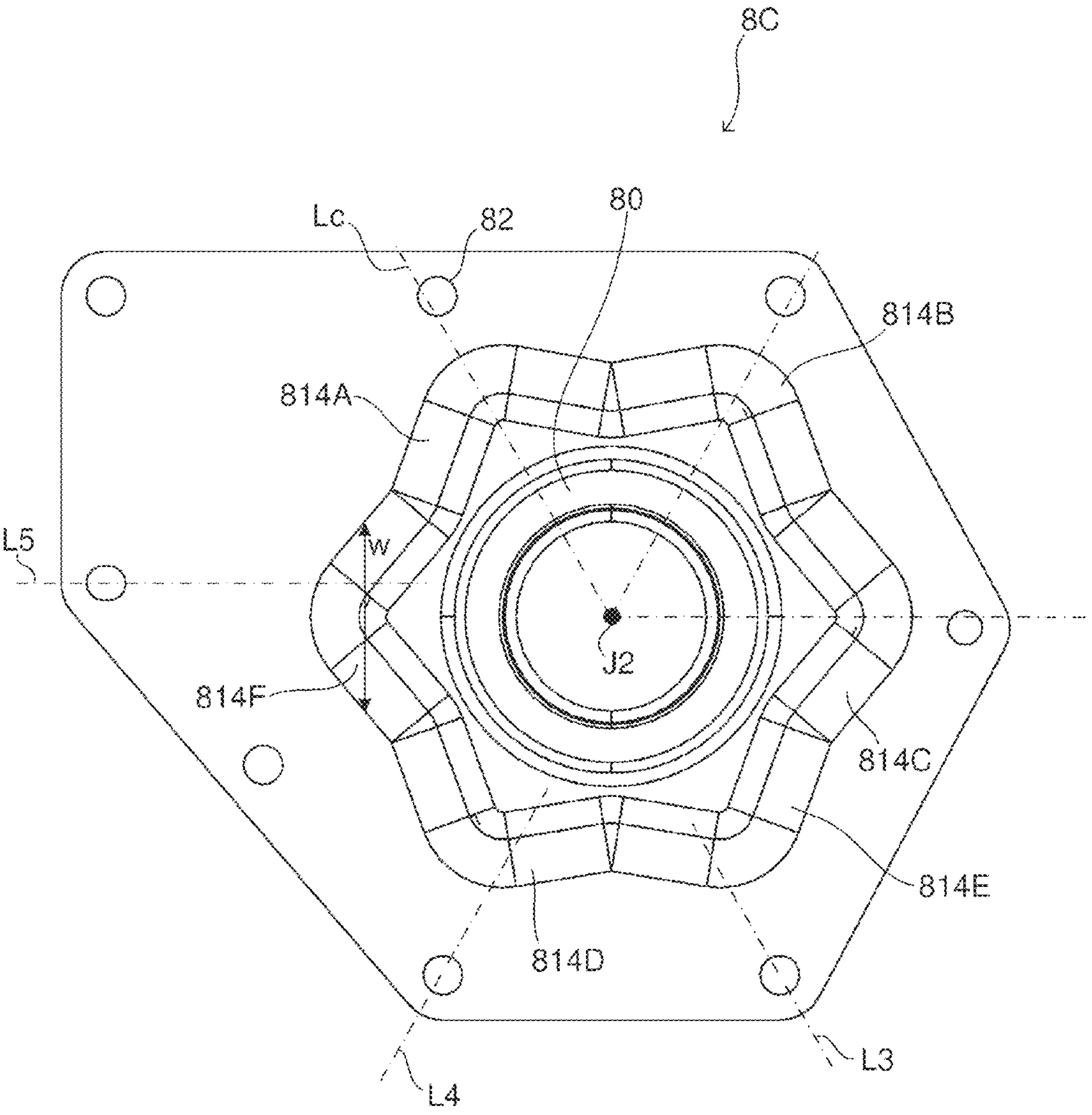
FIG. 17 is a plan view of the cover according to the third embodiment when viewed from the axial one side.

Here, FIG. 17 is a plan view of the cover 8C when viewed from the axial one side. Each of the ribs 814A to 814F shown in FIG. 17 is one of the ribs 81. As shown in FIG. 17, for the ribs 814A to 814C, when viewed in the axial direction, the line segment Lc extending from the rotation axis J2 in the radial direction through the width center position of each of the ribs 814A to 814C passes through the fixing point 82, but for ribs 81 other than these ribs, a similar line segment does not pass through the fixing point 82. However, as shown in FIG. 17, for ribs 814D to 814F, when viewed in the axial direction, extension lines L3 to L5 extending outward from the ribs 814D to 814F in a direction in which each of the ribs 814D to 814F extends (direction parallel to the radial direction) pass through the fixing point 82. That is, for the ribs 814A to 814F, when viewed from the axial direction, the fixing points 82 are formed on the extension lines extending outward from the ribs 814A to 814F in the direction in which each of the ribs 814A to 814F extends. With such ribs 814A to 814F, it is possible to suppress the transmission of vibration from the fixing point 82 to the ring brush 6.

Further, as shown in FIG. 17, the width w of each of the ribs 81 at the same radial position is the same from the radial inner end to the radial outer end of each of all the plurality of ribs 81. As a result, the transmission of vibration can be suppressed in a well-balanced manner in the circumferential direction.

Further, as shown in FIG. 17, the width w of the rib 81 continuously decreases toward a radially outer side. As a result, when the cover 8C is formed by press molding, it can be easily removed in the jig removal process.

Figure 18:
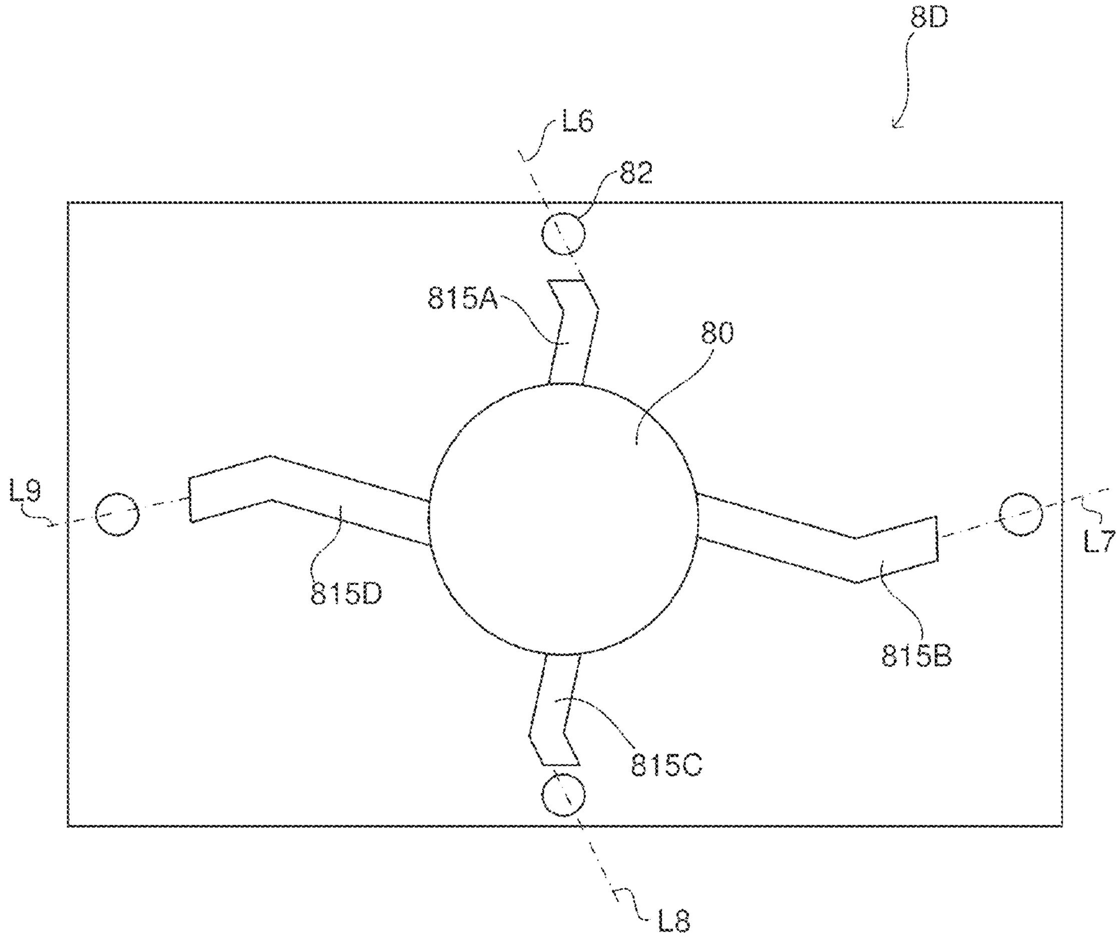
FIG. 18 is a schematic plan view of the cover according to the first modification when viewed from the axial one side.

Hereinafter, modifications of the first to third embodiments described above will be described. FIG. 18 is a schematic plan view of a cover 8D according to the first modification when viewed from the axial one side.

As shown in FIG. 18, each rib 815A to 815D bends and extends in the middle. For such ribs 815A to 815D, fixing points 82 are formed on extension lines L6 to L9 extending outward from the ribs 815A to 815D in the direction in which each of the ribs 815A to 815D extends when viewed from the axial direction. With such ribs 815A to 815D, it is possible to suppress the transmission of vibration from the fixing point 82 to the ring brush 6 accommodated in the accommodation portion 80.

Figure 19:
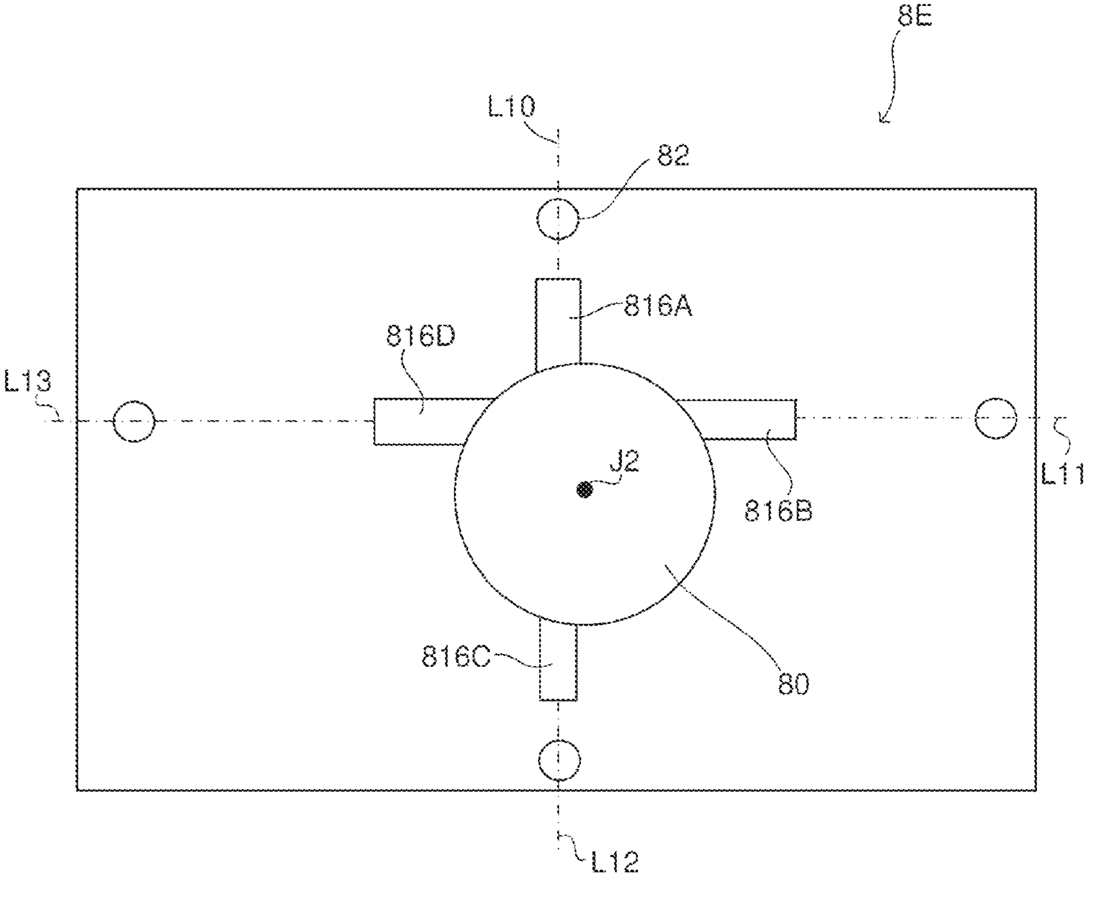
FIG. 19 is a schematic plan view of the cover according to the second modification when viewed from the axial one side.

FIG. 19 is a schematic plan view of the cover 8E according to the second modification when viewed from the axial one side.

As shown in FIG. 19, the direction in which each rib 816A to 816D extends deviates from the radial direction. For such ribs 816A to 816D, the fixing point 82 is formed on the extension lines L10 to L13 extending outward from the ribs 816A to 816D in the direction in which each of the ribs 816A to 816D extends when viewed from the axial direction. With such ribs 816A to 816D, it is possible to suppress the transmission of vibration from the fixing point 82 to the ring brush 6 accommodated in the accommodation portion 80.

Figure 20:
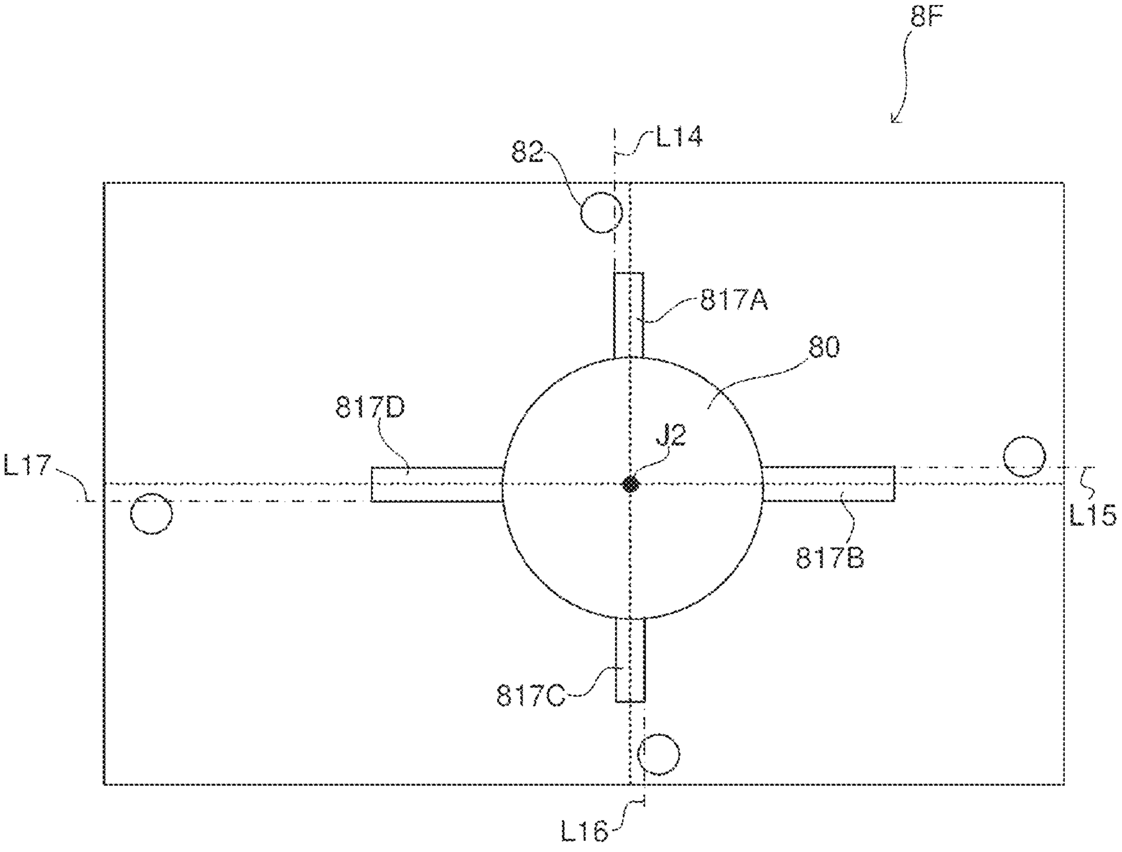
FIG. 20 is a schematic plan view of the cover according to the third modification when viewed from the axial one side.

FIG. 20 is a schematic plan view of the cover 8F according to the third modification when viewed from the axial one side.

As shown in FIG. 20, for all the ribs 817A to 817D, the center line passing through the width center position of each of the ribs does not pass through the fixing point 82. However, also for such ribs 817A to 817D, the fixing point 82 is formed on the extension lines L14 to L17 extending outward from the ribs 817A to 817D in the direction in which each of the ribs 817A to 817D extends when viewed from the axial direction. With such ribs 817A to 817D, it is possible to suppress the transmission of vibration from the fixing point 82 to the ring brush 6 accommodated in the accommodation portion 80.

The embodiments of the present invention are described above. Note that, the scope of the present invention is not limited to the above-described embodiments. The present invention can be implemented by making various modifications to the abovementioned embodiments without departing from the gist of the invention.

The present invention can be used, for example, as a drive motor for various vehicles.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A motor unit comprising:
- a rotor that includes a shaft rotatable around a rotation axis;
- a stator;
- a bearing that rotatably holds the shaft;
- a housing that accommodates the rotor, the stator, and the bearing, and has an opening on an axial one side;
- a cover that closes the opening and is fixed to the housing; and
- an annular member that has an annular shape when viewed from an axial direction and is provided independently from the bearing,
- wherein the cover includes
- an accommodation portion that protrudes from an axial one side outer face to an axial one side, is recessed from an axial other side outer face to the axial one side, and accommodates the annular member,
- one or more ribs that protrude from the axial one side outer face of the cover to the axial one side, and are disposed radially outward of the accommodation portion when viewed from the axial direction, and
- one or more fixing points fixed to the housing,
- the one or more ribs extend outward from the accommodation portion, and
- when viewed from the axial direction, for at least one of the ribs, the fixing point is formed on an extension line extending outward from the at least one rib in a direction in which the at least one rib extends.

2. The motor unit according to claim 1, wherein the number of the one or more ribs is same as the number of the one or more fixing points.

3. The motor unit according to claim 1, wherein
- the ribs include a first rib and a second rib,
- a distance from a connection portion, of the first rib, with the accommodation portion to the fixing point is longer than a distance from a connection portion, of the second rib, with the accommodation portion to the fixing point, and
- the first rib is longer than the second rib.

4. The motor unit according to claim 1, wherein the cover is formed of one plate.

5. The motor unit according to claim 1, wherein
- each of the ribs includes
- a one side protrusion protruding from an axial one side outer face of the cover to an axial one side, and an other side protrusion protruding from an axial other side outer face of the cover to an axial other side.

6. The motor unit according to claim 1, wherein the one or more ribs are a plurality of the ribs, and from a radial inner end to a radial outer end of each of all the plurality of ribs, a width of each of the ribs at the same radial position is the same.

7. The motor unit according to claim 1, wherein radially inner ends of the ribs adjacent to each other in the circumferential direction do not come into contact with each other.

8. The motor unit according to claim 1, wherein a width of each of the rib continuously decreases toward a radially outer side.

9. The motor unit according to claim 1, wherein an axial height of each of the ribs from the axial one side outer face continuously decreases toward an outer side.

10. The motor unit according to claim 1, wherein each of the fixing point is a through hole through which a bolt passes in the axial direction, and a bolt accommodation portion that is recessed to an axial other side and accommodates a head of the bolt is formed around the through hole.

11. The motor unit according to claim 1, wherein the annular member is a ring brush, the ring brush includes a conductive ring that has an annular shape and has conductivity, and a brush portion that is fixed to a radial inner circumferential face of the conductive ring, has conductivity, and is bendable in a circumferential direction, and an outer circumferential face of the shaft is in contact with the brush portion.

12. The motor unit according to claim 1, wherein the annular member is capable of coming into contact with a deformed portion, due to crimping, of a wall face, of the accommodation portion, extending in the circumferential direction.

13. The motor unit according to claim 12, wherein the annular member is fixed to the accommodation portion by press fitting.

14. The motor unit according to claim 12, wherein the deformed portion includes a plurality of deformed portions, and the plurality of deformed portions is disposed at equal intervals in the circumferential direction.

15. The motor unit according to claim 12, wherein the deformed portion is provided at an axial other side end portion of an annular wall portion included in the accommodation portion, and is bent radially inward.

* * * * *